(12) United States Patent
Oka

(10) Patent No.: US 12,725,738 B2
(45) Date of Patent: Sep. 1, 2026

(54) FILM CAPACITOR

(71) Applicant: Murata Manufacturing Co., Ltd., Nagaokakyo (JP)

(72) Inventor: Shoji Oka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 146 days.

(21) Appl. No.: 18/897,483

(22) Filed: Sep. 26, 2024

(65) Prior Publication Data

US 2025/0014823 A1 Jan. 9, 2025

Related U.S. Application Data

(63) Continuation of application No. PCT/JP2023/012765, filed on Mar. 29, 2023.

(30) Foreign Application Priority Data

Apr. 6, 2022 (JP) ................................ 2022-063571

(51) Int. Cl.
*H01G 4/224* (2006.01)
*H01G 4/236* (2006.01)
*H02M 7/00* (2006.01)

(52) U.S. Cl.
CPC ............ *H01G 4/224* (2013.01); *H01G 4/236* (2013.01); *H02M 7/003* (2013.01)

(58) Field of Classification Search
None
See application file for complete search history.

(56) References Cited

U.S. PATENT DOCUMENTS 8,879,256 B2 * 11/2014 Ichijyo ............... H05K 7/20927 257/734
10,102,975 B2 * 10/2018 Yang ........................ H01G 4/33
(Continued)

FOREIGN PATENT DOCUMENTS

JP S52-138665 A 11/1977
JP S5363652 U 5/1978
(Continued)

OTHER PUBLICATIONS

JP '731 translation (Year: 2016).*
(Continued)

*Primary Examiner* — Dion R. Ferguson
(74) *Attorney, Agent, or Firm* — ArentFox Schiff LLP

(57) ABSTRACT

A film capacitor including: a capacitor element including a laminate of a dielectric film and an internal electrode, a first end surface electrode on a first end surface of the laminate, and a second end surface electrode on a second end surface of the laminate; a laminate film including a covering part covering the capacitor element, and a flange extending from an outer edge of the covering part; a first terminal electrode connected to the first end surface electrode inside the laminate film and exposed outside of the laminate film, and a second terminal electrode connected to the second end surface electrode inside the laminate film and exposed outside of the laminate film; and a fixing member including a main body disposed along the capacitor element inside the laminate film, and a fixing part extending from the main body and exposed to the outside of the laminate film.

16 Claims, 29 Drawing Sheets

(56) References Cited

U.S. PATENT DOCUMENTS

| | | | | | |
|---|---|---|---|---|---|
| 11,282,649 | B2 * | 3/2022 | Takeoka | H01G 4/224 |
| 2013/0108915 | A1 * | 5/2013 | Fukuda | H01M 50/193 429/211 |
| 2017/0053744 | A1 * | 2/2017 | Ichinose | H01G 4/33 |
| 2020/0118762 | A1 * | 4/2020 | Takeoka | H01G 4/236 |
| 2021/0043377 | A1 * | 2/2021 | Maeno | H01G 4/40 |
| 2024/0371574 | A1 * | 11/2024 | Jogan | H01G 4/38 |
| 2025/0014823 | A1 * | 1/2025 | Oka | H01G 4/32 |
| 2025/0104912 | A1 * | 3/2025 | Oka | H01G 2/02 |

FOREIGN PATENT DOCUMENTS

| | | | | | |
|---|---|---|---|---|---|
| JP | S5710730 | U | | 1/1982 | |
| JP | S59-143001 | U | | 9/1984 | |
| JP | H0518017 | U | | 3/1993 | |
| JP | 4354240 | B2 | | 10/2009 | |
| JP | 2016157755 | A | * | 9/2016 | |
| JP | 2021036551 | A | * | 3/2021 | |
| JP | 2025187209 | A | * | 12/2025 | |
| KR | 101811987 | B1 | * | 12/2017 | H01G 2/106 |
| WO | WO-2016082731 | A1 | * | 6/2016 | H01G 4/38 |
| WO | WO-2020162138 | A1 | * | 8/2020 | H01G 4/002 |
| WO | WO-2022009680 | A1 | * | 1/2022 | H01G 4/38 |
| WO | WO-2022176401 | A1 | * | 8/2022 | H01G 2/02 |
| WO | 2023/140104 | A1 | | 7/2023 | |
| WO | WO-2023140095 | A1 | * | 7/2023 | H01G 2/02 |

OTHER PUBLICATIONS

WO ’680 translation (Year: 2022).*
WO ’401 Translation (Year: 2022).*
WO ’095 Translation (Year: 2023).*
International Search Report received for PCT Patent Application No. PCT/JP2023/012765, mailed on Jun. 20, 2023, 3 pages (English Translation Only).

* cited by examiner

FILM CAPACITOR

CROSS REFERENCE TO RELATED APPLICATIONS

The present application is a continuation of International application No. PCT/JP2023/012765, filed Mar. 29, 2023, which claims priority to Japanese Patent Application No. 2022-063571, filed Apr. 6, 2022, the entire contents of each of which are incorporated herein by reference.

TECHNICAL FIELD

The present disclosure relates to a film capacitor.

BACKGROUND ART

A capacitor using a laminate film as an exterior material is known. For example, a surface mount capacitor described in Patent Document 1 has a capacitor element externally covered with a laminate film.

Patent Document 1: JP-B2-4354240

SUMMARY OF THE DISCLOSURE

The surface mount capacitor of Patent Document 1 has a problem that it is difficult to fix the surface mount capacitor to a casing.

The present disclosure provides a film capacitor that can be firmly fixed to a casing.

A film capacitor according to one embodiment of the present disclosure includes: a capacitor element including a laminate of a dielectric film and an internal electrode, a first end surface electrode on a first end surface of the laminate, and a second end surface electrode on a second end surface of the laminate; a laminate film including a covering part covering the capacitor element, and a flange extending from an outer edge of the covering part; a first terminal electrode connected to the first end surface electrode of the capacitor element inside the laminate film and exposed to an outside of the laminate film, and a second terminal electrode connected to the second end surface electrode of the capacitor element inside the laminate film and exposed to the outside of the laminate film; and a fixing member including a main body disposed along the capacitor element inside the laminate film, and a fixing part extending from the main body and exposed to the outside of the laminate film.

The present disclosure can provide a film capacitor that can be firmly fixed to a casing.

BRIEF DESCRIPTION OF THE DRAWINGS

FIG. 17 is an exploded perspective view of a film capacitor according to a first modification of the third embodiment.

DETAILED DESCRIPTION OF THE PREFERRED EMBODIMENTS (Background of the Present Disclosure)

In accordance with technical trends such as reduction in size and weight, increase in heat resistance, and increase in power density of a power converter, capacitors used in the power converter are also required to be reduced in size and weight, increase in heat resistance, increase in power density, and so on.

A capacitor in which a capacitor element formed of a laminate of a dielectric body and an electrode is externally covered with a laminate film has been proposed mainly for the purpose of reducing the size and weight. For example, Patent Document 1 discloses a surface mount capacitor including a capacitor element having a drawn lead and externally covered with a laminate film, and a fixing plate including an external connection terminal.

In the case of a capacitor externally covered with a laminate film, such as the surface mount capacitor described in Patent Document 1, the exterior laminate film is flexible, and thus it is difficult to fix the capacitor to a casing of a power converter using the laminate film. A typical capacitor has a structure in which the capacitor is housed in a plastic case and the case is filled with an epoxy resin or the like. Unlike such a typical capacitor, in a capacitor externally covered with a laminate film, the laminate film may be peeled off because of a mechanical load, an environmental load, or the like, and a gap may be generated between the capacitor element and the laminate film. Thus, there is a possibility that heat dissipation performance deteriorates in the capacitor externally covered with a laminate film.

The inventors of the present disclosure have created a film capacitor that can be firmly fixed to a casing by disposing a member for fixing to the casing in a capacitor externally covered with a laminate film, and have reached the following disclosure.

Hereinafter, a first embodiment according to the present disclosure will be described with reference to the accompanying drawings. In each drawing, each element is exaggerated in order to facilitate the description.

First Embodiment

[Overall Configuration]

Figure 1:
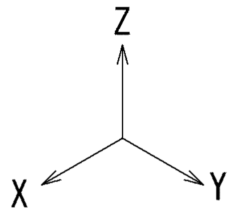
FIG. 1 is a perspective view illustrating a state in which a film capacitor according to first embodiment is fixed to a casing.
Figure 2:
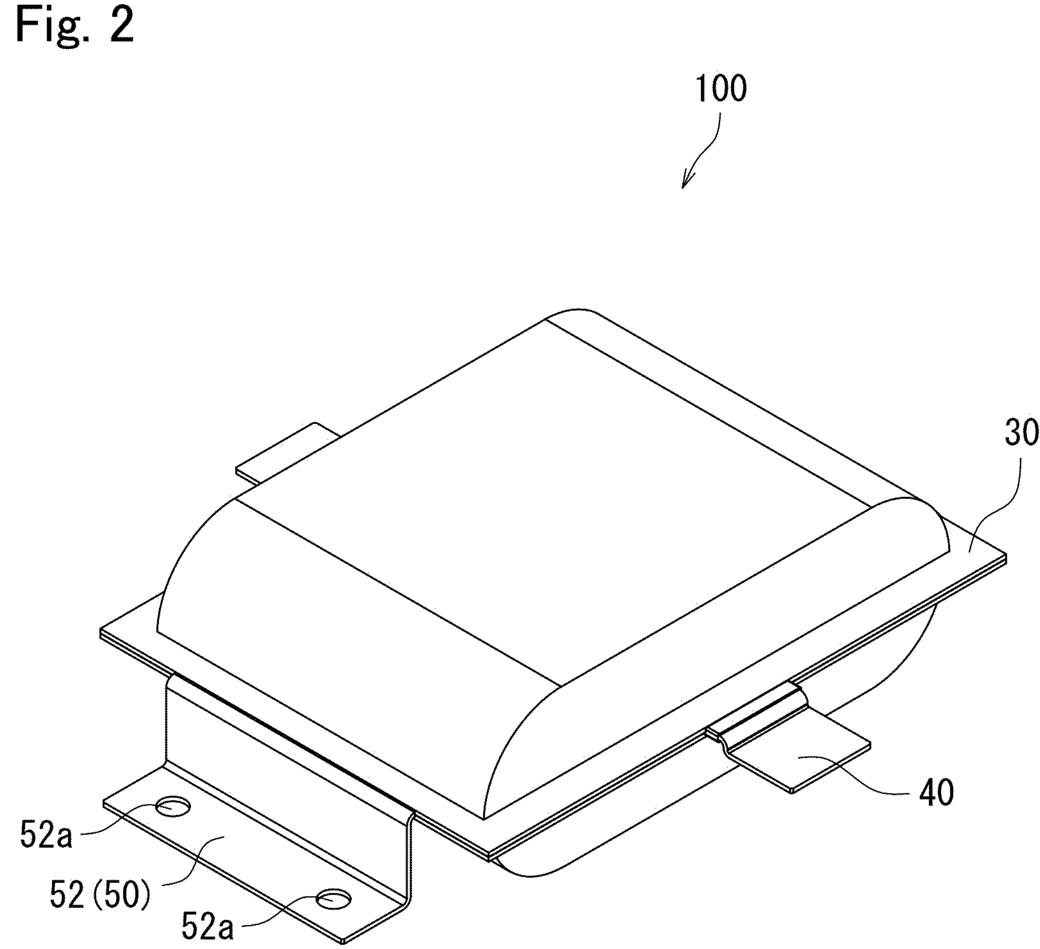
FIG. 2 is a perspective view of the film capacitor according to the first embodiment.
Figure 2:
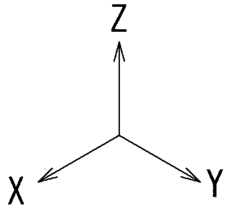
Figure 3:
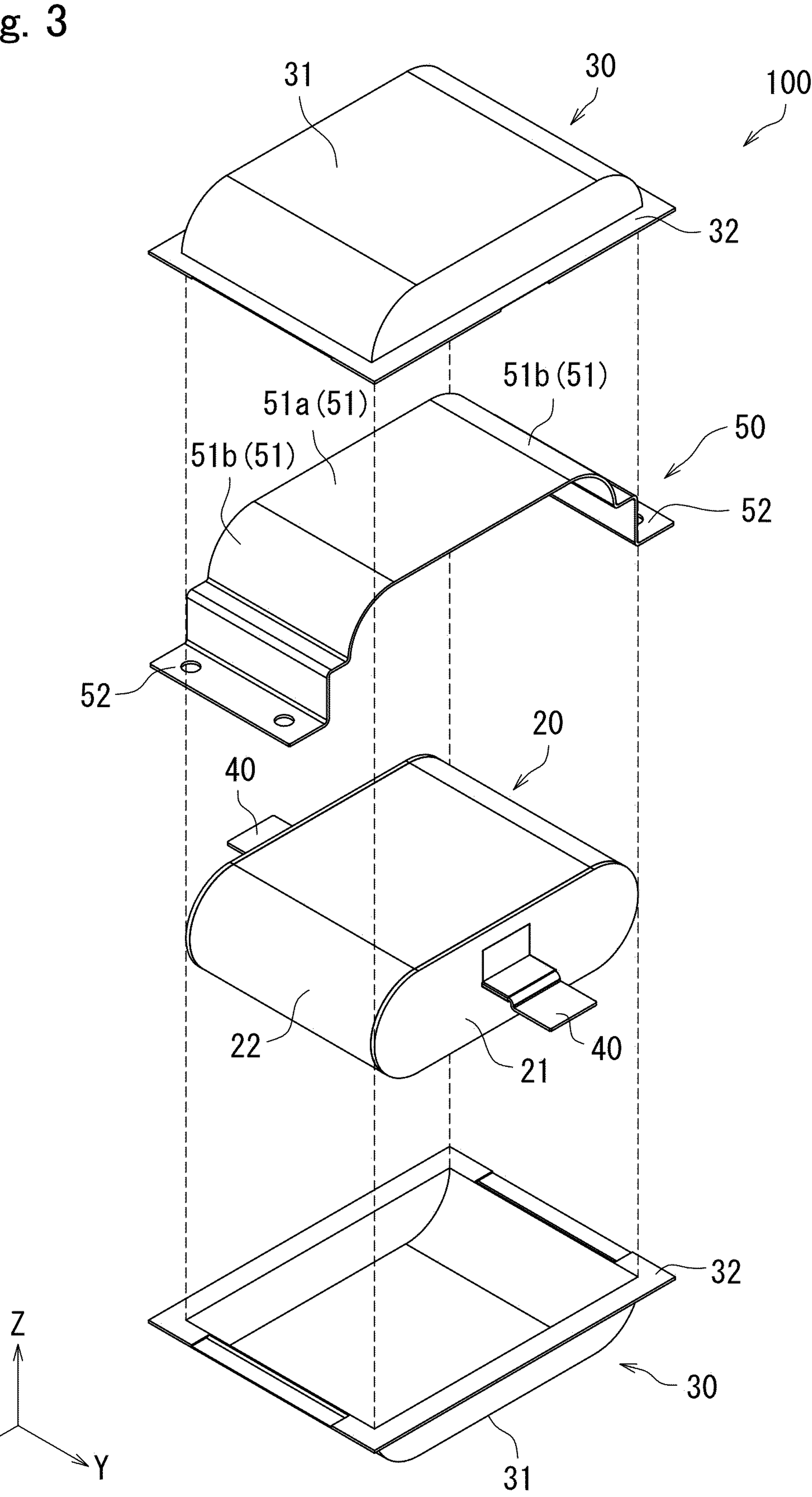
FIG. 3 is an exploded perspective view of the film capacitor of FIG. 2.

FIG. 1 is a perspective view illustrating a state in which a film capacitor according to the first embodiment is fixed to a casing. FIG. 2 is a perspective view of the film capacitor according to the first embodiment. FIG. 3 is an exploded perspective view of the film capacitor of FIG. 2. X, Y, and Z directions in the drawings respectively indicate a lateral direction, a longitudinal direction, and a height direction of the film capacitor.

A film capacitor 100 is a capacitor to be fixed to a casing 10. As illustrated in FIGS. 1 to 3, the film capacitor 100 includes a capacitor element 20, a laminate film 30, a terminal electrode 40, and a fixing member 50. The casing 10 is, for example, a casing of a power converter such as an inverter incorporating the film capacitor 100. The casing 10 may have a cooling function, but it does not have to have a cooling function.

<Capacitor Element>

Figure 4A:
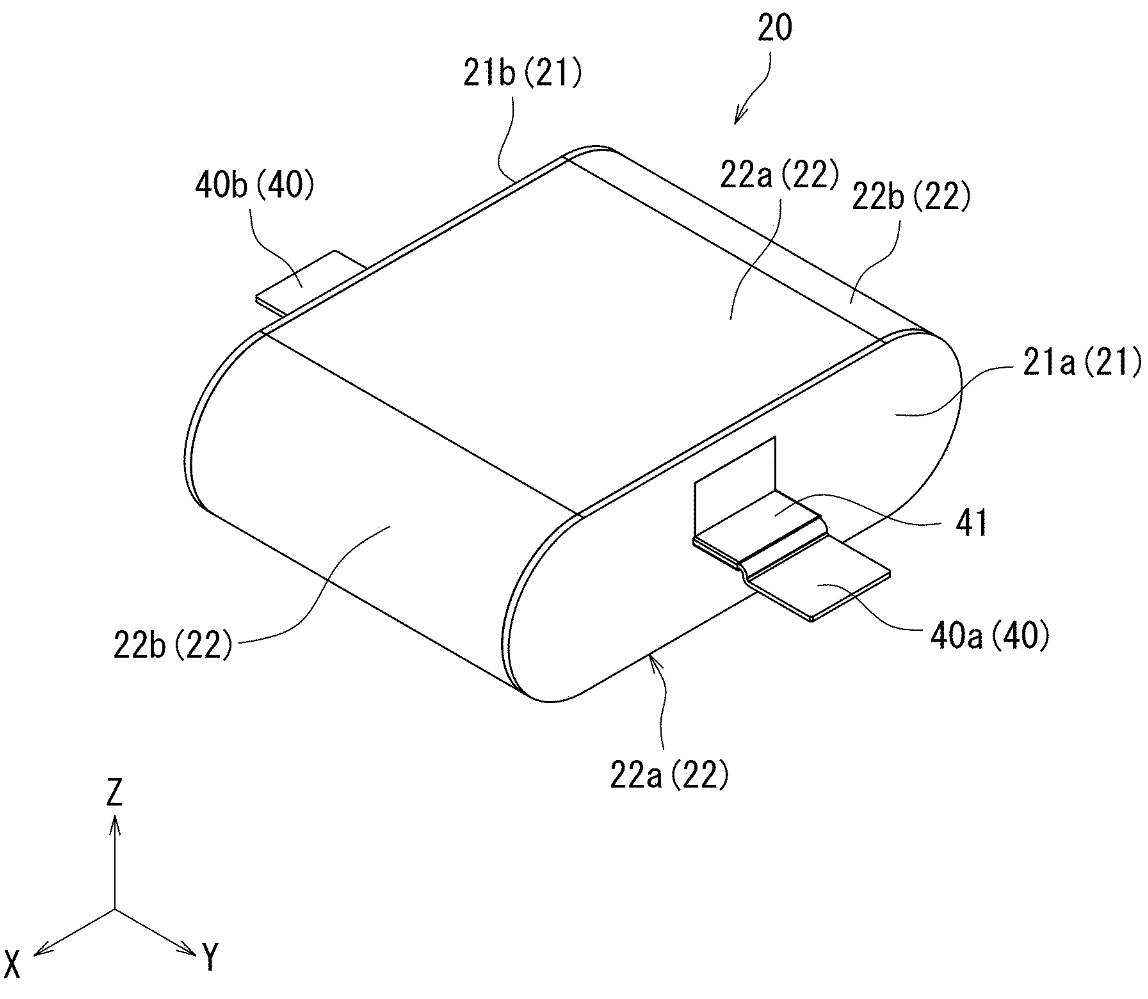
FIG. 4A is a perspective view of a capacitor element of the film capacitor of FIG. 2.
Figure 4B:
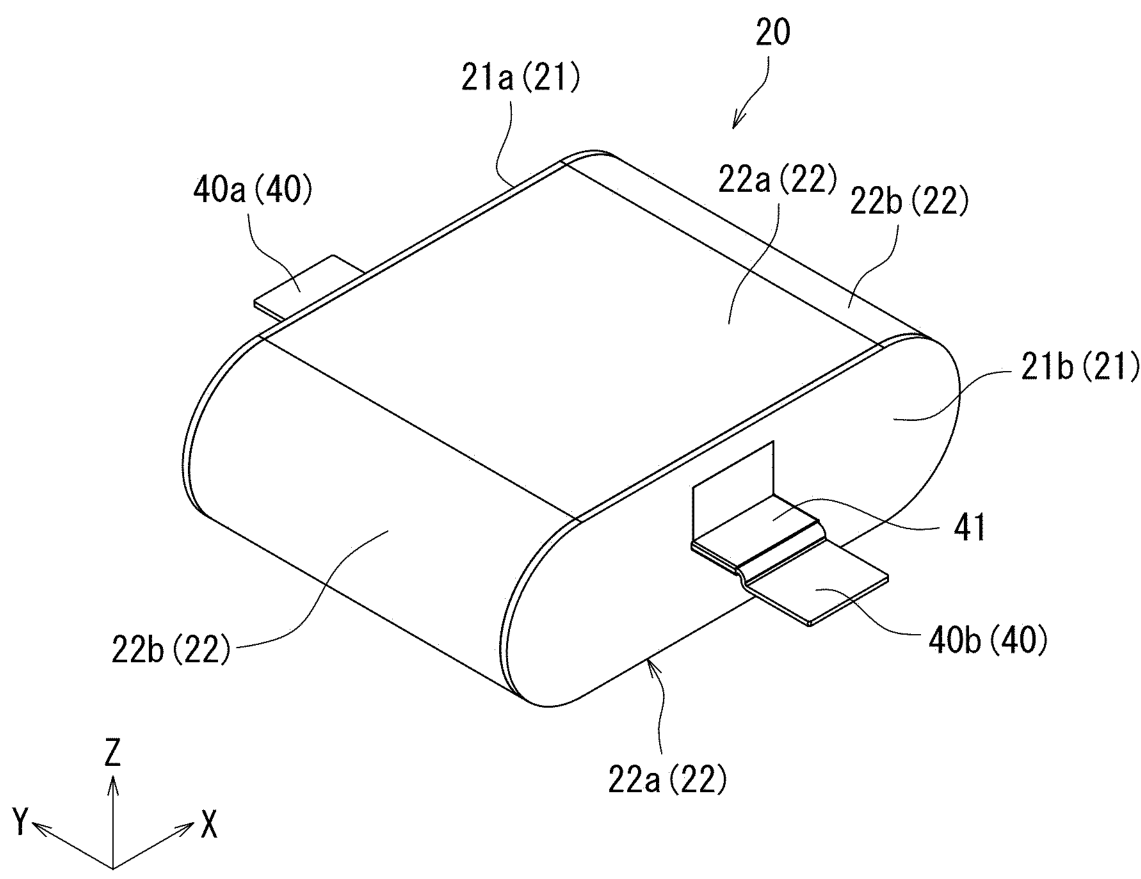
FIG. 4B is a perspective view of the capacitor element of FIG. 4A as seen from another angle.

FIG. 4A is a perspective view of a capacitor element of the film capacitor of FIG. 2. FIG. 4B is a perspective view of the capacitor element of FIG. 4A as seen from another angle. As illustrated in FIGS. 4A and 4B, the capacitor element 20 is formed of, for example, a wound body or a laminate of a dielectric film and an internal electrode. The laminate of the dielectric film includes a laminate formed by winding the dielectric film. As illustrated in FIG. 2, the capacitor element 20 includes a pair of end surface electrodes 21 provided on one end surface and the other end surface of the laminate. A terminal electrode 40 is connected to each of the one end surface electrode 21*a* and the other end surface electrode 21*a*.

In the present embodiment, the capacitor element 20 is a columnar capacitor element having an oval section. As the dielectric film forming the capacitor element, for example, a plastic film such as polyethylene terephthalate, polypropylene, polyphenylene sulfide, or polyethylene naphthalate can be used. As the vapor deposited metal film provided on the surface of the plastic film as an internal electrode, for example, a metal such as aluminum or zinc can be used.

In the present embodiment, a side surface 22 that connects the one end surface electrode 21*a* and the other end surface electrode 21*b* is provided. The side surface 22 includes a pair of flat parts 22*a* facing each other and a pair of curved parts 22*b* connecting one flat part 22*a* and the other flat part 22*a*.

<Laminate Film>

The laminate film 30 is an exterior material that covers the capacitor element 20 to improve moisture resistance of the capacitor element 20. As illustrated in FIGS. 1 to 3, the laminate film 30 includes a covering part 31 covering the capacitor element 20, and a flange 32 extending from an outer edge of the covering part 31.

The laminate film 30 is disposed so as to sandwich the capacitor element 20 from above and below. The capacitor element 20 can be covered by fusing the flanges 32 of the respective laminate films 30.

As the laminate film 30, a film obtained by bonding a resin film and an aluminum foil can be used. Specifically, it is possible to use an aluminum laminate film obtained by bonding an aluminum foil between a resin film having heat-scalability such as unstretched polypropylene (CPP) and a resin film having excellent strength such as nylon or polyethylene terephthalate by an adhesive or thermocompression bonding. The aluminum layer is excellent in water vapor barrier properties, and moisture resistance of the capacitor element 20 can be improved by covering the capacitor element 20 with an aluminum laminate film having the aluminum layer. The laminate film 30 is not limited to an aluminum laminate film, and a material having high adhesiveness between laminate films, water vapor barrier properties, strength, or durability can be appropriately adopted as the laminate film 30. Covering the capacitor element 20 with the laminate film 30 can improve the weather resistance of the capacitor element 20.

For example, the capacitor element 20 can be covered with the laminate film 30 by sandwiching the capacitor element 20 between two films and bonding them by thermal fusion bonding. At this time, the film is brought into close contact with the capacitor element 20 to form the covering part 31. In addition, the flange 32 in which two films are overlapped and bonded is provided on the outer edge of the covering part 31. Thus, the flange 32 is a bonded part or a fused part in which the films overlap and are bonded or fused.

In the present embodiment, since the capacitor element 20 is sandwiched between two films and thermally fused, the flange 32 are provided on the four sides of the capacitor element 20. That is, the flange 32 has four sides. In other words, the flange 32 is provided on each of the four sides of the rectangular capacitor element 20 when viewed in the height direction (Y direction), and the flanges are continuously connected to form an annular shape. The flange 32 is not necessarily provided on all the four sides of the capacitor element 20.

The capacitor element 20 has a rectangular shape when viewed from the height direction (Y direction).

<Terminal Electrode>

The terminal electrode 40 is electrically connected to the end surface electrode 21 of the capacitor element 20 inside the laminate film 30. In the present embodiment, the terminal electrode 40 includes a pair of terminal electrodes including one terminal electrode 40*a* connected to the one end surface electrode 21*a* and the other terminal electrode 40*b* connected to the other end surface electrode 21*b*. A part of the terminal electrode 40 is exposed to the outside of the laminate film 30.

In the terminal electrode 40, a sealant material 41 for enhancing adhesiveness, airtightness, and insulation is preferably disposed at a portion to be bonded to the laminate film

30. Even when a relatively thick terminal electrode 40 is used, moisture resistance can be improved without forming an opening between the laminate film 30 and the terminal electrode 40. When the laminate film 30 includes a metal layer, insulation between the terminal electrode 40 and the metal layer can be improved. As the sealant material 41, for example, polypropylene containing an acid-modified resin or the like can be adopted.

In the present embodiment, each of the pair of terminal electrodes 40 is exposed from corresponding one of two opposing sides of the flange 32.

<Fixing Member>

The fixing member 50 is a member for fixing the film capacitor 100 to the casing 10. As illustrated in FIG. 3, the fixing member 50 includes a main body 51 and a fixing part 52. The main body 51 is disposed along the capacitor element 20 inside the laminate film 30. The fixing part 52 is a part extending from the main body 51 and exposed to the outside of the laminate film 30, and is used for fixing to the casing 10. The fixing part 52 can be fixed to the casing 10 with a fixing tool such as a screw using, for example, a hole 52*a* provided in the fixing part 52 illustrated in FIG. 2.

In the present embodiment, one fixing member 50 is disposed in the film capacitor 100. Configuring the fixing member 50 with one member makes it possible to reduce the production cost of the film capacitor 100 and simplify the production process of the film capacitor 100.

The fixing member 50 can be made of, for example, an organic material including a composite material such as synthetic resin or FRP. The fixing member 50 may also be made of an inorganic material such as metal. The fixing member 50 is formed of a material and in a shape having a mechanical strength required for fixing the film capacitor 100 to the casing 10. The fixing member 50 may be formed of a material or in a shape having desired thermal conductivity, electrical characteristics, and the like.

The main body 51 of the fixing member 50 is brought into close contact with the side surface 22 of the capacitor element 20 by fusing the laminate films 30 to each other. The main body 51 may be joined to the side surface 22 of the capacitor element 20 with an adhesive or the like.

The main body 51 is disposed along the side surface 22 of the capacitor element 20. Specifically, as illustrated in FIG. 3, the main body has a shape having a flat portion 51*a* along the flat part 22*a* and a curved portion 51*b* along the curved part 22*b*, and is disposed in contact with the side surface 22 of the capacitor element 20.

Figure 5:
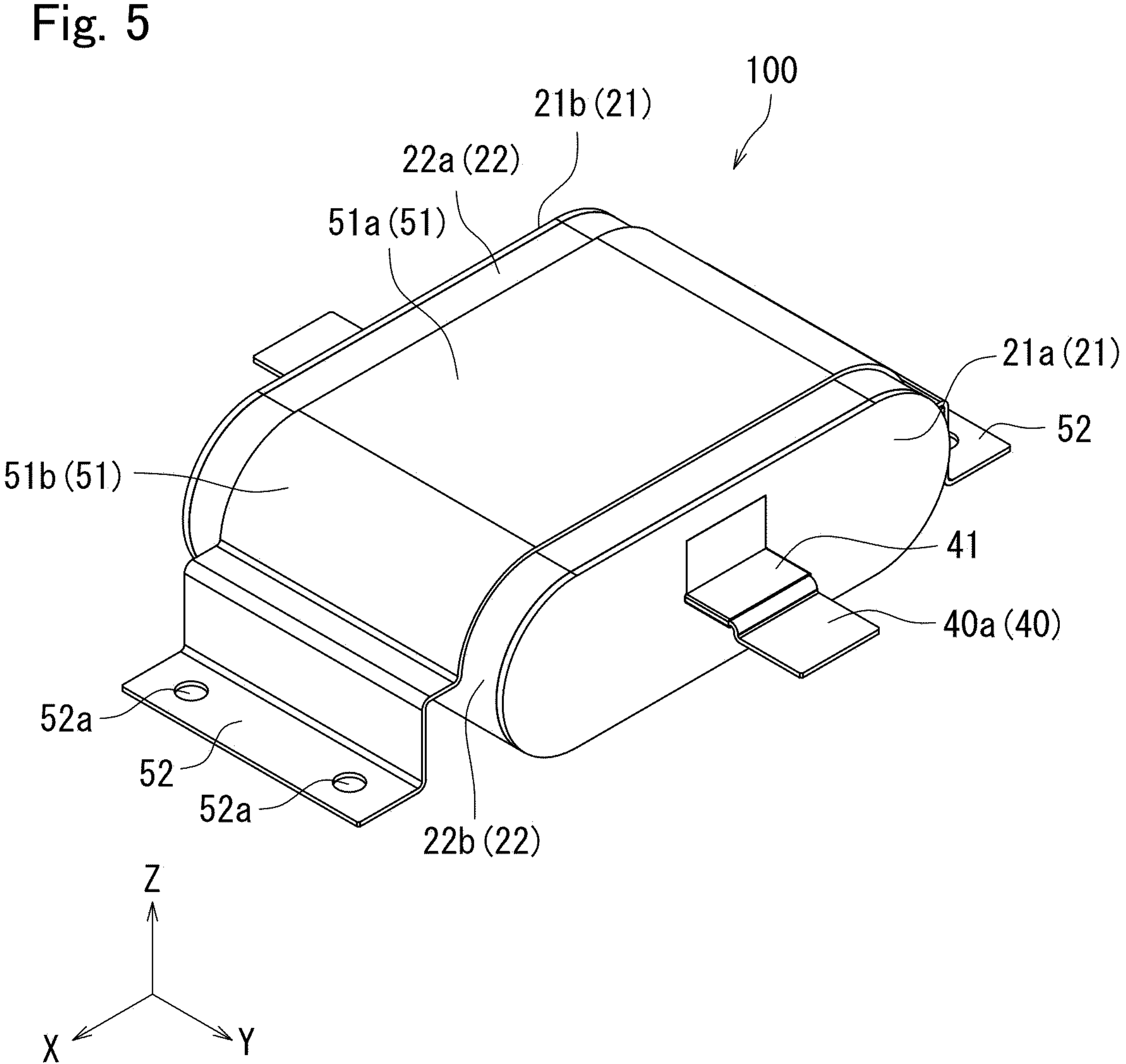
FIG. 5 is a perspective view of the film capacitor of FIG. 2 without a laminate film.

FIG. 5 is a perspective view of the film capacitor of FIG. 2 without a laminate film. As illustrated in FIG. 5, the flat portion 51*a* of the main body 51 is disposed in contact with the flat part 22*a* of the capacitor element 20, and the curved part 51*b* of the main body 51 is disposed in contact with the curved part 22*b* of the capacitor element 20.

Figure 6:
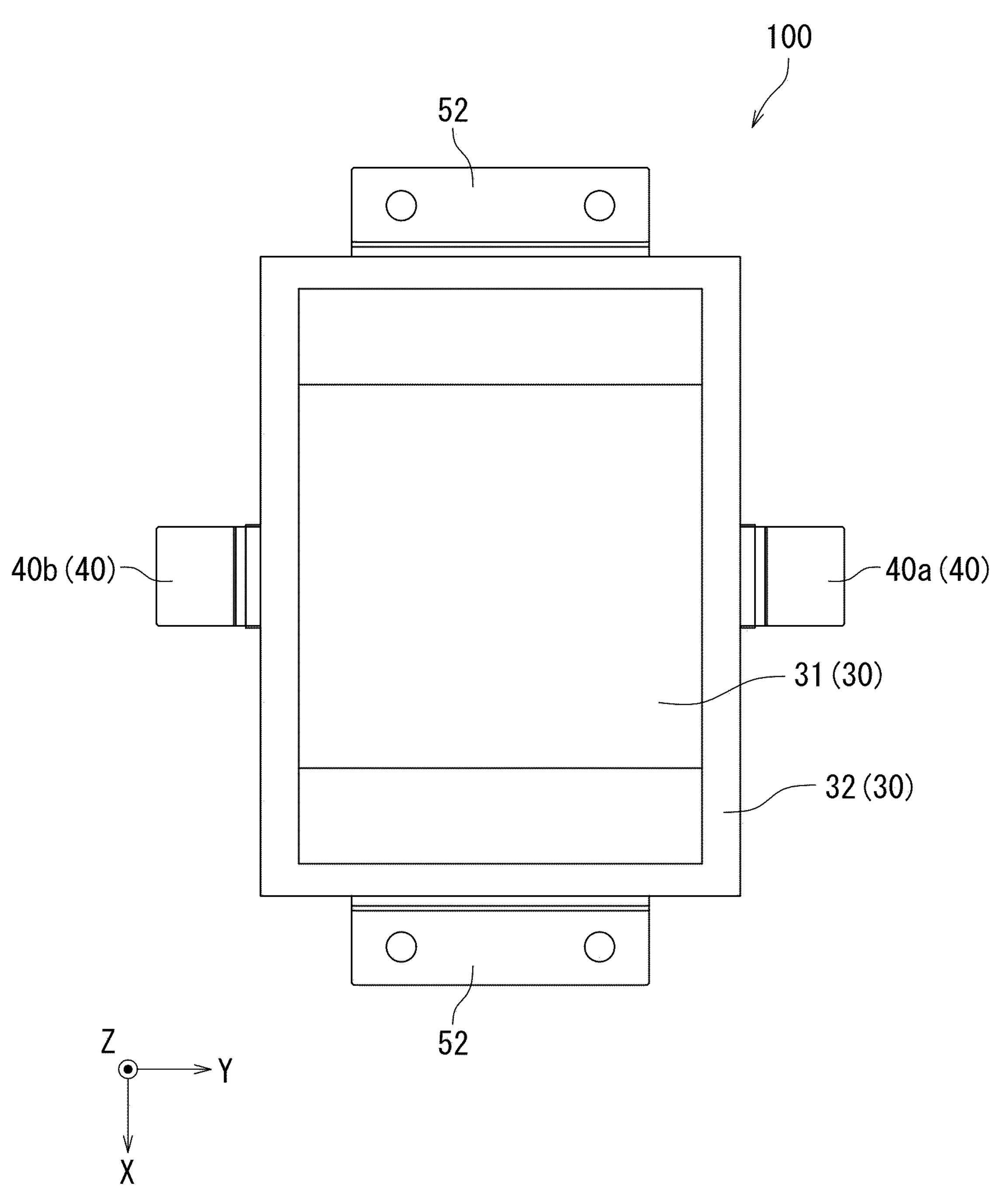
FIG. 6 is a plan view of the film capacitor of FIG. 2.

FIG. 6 is a plan view of the film capacitor of FIG. 2. In the present embodiment, the terminal electrodes 40 and the fixing part 52 of the fixing member 50 are respectively exposed from different sides of the flange 32. Specifically, as illustrated in FIG. 6, two terminal electrodes 40 are respectively exposed from opposing sides of the flange 32, and two fixing parts 52 are respectively exposed from opposing sides of the flange 32 different from the terminal electrodes 40.

Figure 7:
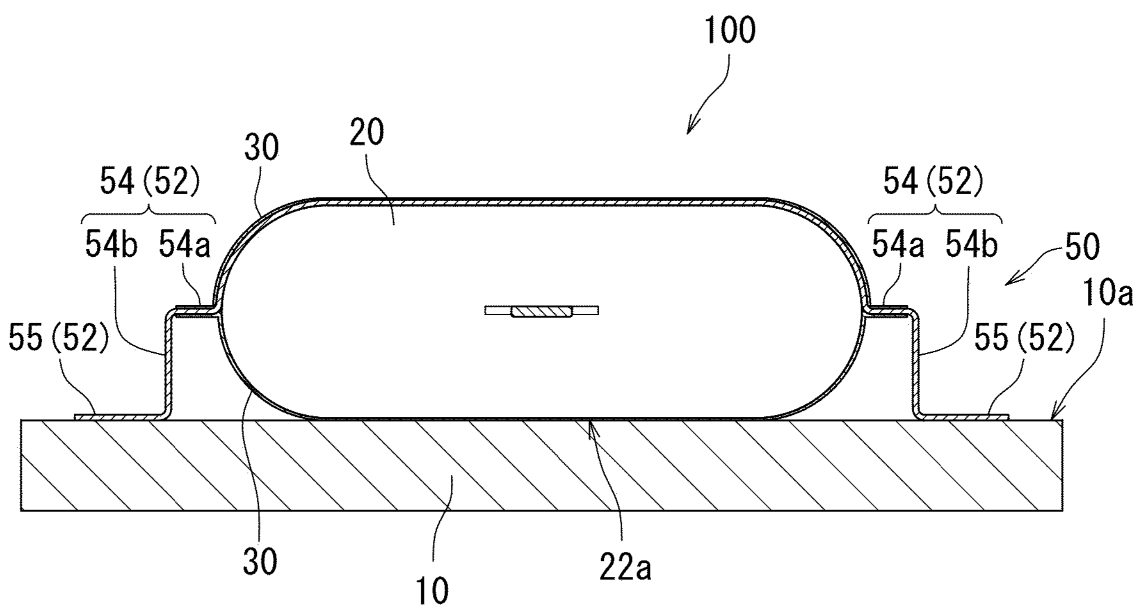
FIG. 7 is an A-A sectional view of the film capacitor of FIG. 1.
Figure 7:
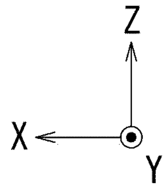

FIG. 7 is an A-A sectional view of the film capacitor of FIG. 1. As illustrated in FIG. 7, the fixing part 52 includes an extension 54 extending from the main body 51 toward the casing 10, and a connection part 55 extending from the extension 54 along the mounting surface 10*a* of the casing 10. The connection part 55 extends outward from the extension 54.

The connection part 55 can be fixed to the mounting surface 10*a* of the casing 10 using, for example, a fixing tool such as a screw, can be fixed to the mounting surface 10*a* of the casing 10 with an adhesive or the like, or can be fixed to the mounting surface 10*a* of the casing 10 by a welding method.

In the present embodiment, the extension 54 includes a first extension 54*a* extending from the laminate film 30, and a second extension 54*b* that is bent from the first extension 54*a* and extending toward the casing 10. The connection part 55 extends from the second extension 54*b* along the mounting surface 10*a* of the casing 10. Forming the fixing part 52 in such a shape can bring the connection part 55 into contact with the casing 10 by disposing the film capacitor 100 on the mounting surface 10*a* of casing 10. Thus, the film capacitor 100 can be easily fixed to the casing 10.

As illustrated in FIG. 7, by adjusting the height of the second extension 54*b*, the film capacitor 100 can be fixed such that the flat part 22*a* of the side surface 22 of the capacitor element 20 comes into contact (via the laminate film 31) with the mounting surface 10*a* of the casing 10. For example, when the casing 10 has a cooling function, overheating of the film capacitor 100 can be suppressed by bringing the side surface 22 of the capacitor element 20 into contact with the casing 10.

The film capacitor 100 can be produced, for example, by attaching the fixing member 50 to the capacitor element 20 illustrated in FIGS. 4A to 4B and covering the capacitor element with the laminate film 30. The fixing member 50 can be attached to the capacitor element 20 by joining the main body 51 of the fixing member 50 to the side surface 22 of the capacitor element 20 with, for example, an adhesive. The film capacitor 100 can be completed by covering the capacitor element 20 attached with the fixing member 50 with the laminate film 30.

[Effects]

The above-described embodiment can exhibit the following effects.

The film capacitor 100 is a film capacitor to be fixed to the casing 10, the film capacitor including the capacitor element 20, the laminate film 30, the terminal electrode 40, and the fixing member 50. The capacitor element 20 includes a laminate of a dielectric film and an internal electrode, and end surface electrodes 21 respectively provided on one end surface and the other end surface of the laminate. The laminate film 30 includes the covering part 31 covering the capacitor element 20 and a flange 32 extending from an outer edge of the covering part 31. The terminal electrode 40 is connected to each of the end surface electrodes 21 of the capacitor element 20 inside the laminate film 30 and exposed to the outside of the laminate film 30. The fixing member 50 is a member for fixing the film capacitor 100 to the casing 10. The fixing member 50 includes the main body 51 disposed along the capacitor element 20 inside the laminate film 30, and the fixing part 52 extending from the main body 51 and exposed to the outside of the laminate film 30.

Such a configuration makes it possible to firmly fix the film capacitor 100 to the casing 10. Since the fixing part of the fixing member 50 is disposed inside the laminate film 30, the fixing member 50 can be used for fixing the film capacitor 100 to the casing 10. Thus, the film capacitor 100 covered with the laminate film 30 can be firmly fixed to the casing 10 without using a resin or the like. Further, exposing the fixing part 52 of the fixing member 50 from the flange 32 of the laminate film 30 makes it possible to easily fix the film capacitor 100 to the casing 10.

In the film capacitor 100, the main body 51 of the fixing member 50 can be disposed along the side surface 22 of the capacitor element 20, and the capacitor element 20 can be fixed so as to be pressed against the casing 10. Thus, the film capacitor 100 can be firmly fixed to the casing 10.

The flange 32 has a plurality of sides, and the terminal electrodes 40 and the fixing part 52 are respectively exposed from different sides of the flange 32.

Such a configuration makes it possible to suppress interference between the terminal electrode 40 and the fixing member 50. In addition, the space of the casing 10 can be effectively used. Further, the film capacitor 100 can be mounted on the casing 10 in a well-balanced manner while interference with the terminal electrode 40 is suppressed.

The fixing parts 52 of the fixing member 50 are respectively exposed from two opposing sides of the flange 32.

Such a configuration makes it possible to more firmly fix the film capacitor 100 to the casing 10. Further, by placing the film capacitor 100 on the casing 10, the fixing part 52 can be disposed on the casing 10. Thus, work efficiency when the film capacitor 100 is attached to the casing 10 can improve.

The capacitor element 20 includes the side surface 22 connecting the end surface electrodes 21, and the main body 51 of the fixing member 50 is disposed along the side surface 22 of the capacitor element 20.

Such a configuration makes it possible to more firmly fix the film capacitor 100 to the casing 10. The main body 51 does not straddle the end surface electrode 21, and thus the influence of the fixing member 50 on the electrical characteristics of the film capacitor 100 can be reduced.

The side surface 22 of the capacitor element 20 includes a pair of flat parts 22*a* facing each other and a pair of curved parts 22*b* connecting one of the flat parts 22*a* and the other of the flat parts 22*a*. The fixing member 50 is disposed along both the flat part 22*a* and the curved part 22*b*.

Such a configuration can bring the fixing member 50 into close contact with the side surface 22 of the capacitor element 20. Thus, it is possible to more firmly fix the film capacitor 100 to the casing 10.

The fixing part 52 of the fixing member 50 includes the extension 54 extending from the main body 51 toward the casing 10, and the connection part 55 extending from the extension 54 along the mounting surface 10*a* of the housing 10 to be connected to the casing 10.

Such a configuration makes it possible to change the distance between the film capacitor 100 and the casing 10 by changing the length of the extension 54, which can realize the disposition of the film capacitor 100 suitable for the surrounding thermal environment.

The extension 54 includes the first extension 54*a* extending from the laminate film 30, and the second extension 54*b* that is bent from the first extension 54*a* and extending toward the casing 10.

With such a configuration, by disposing the film capacitor 100 to the casing 10, the connection part 55 can be brought into contact with the casing 10. Thus, it is possible to easily fix the film capacitor 100 to the casing 10.

[Modifications]

In the above-described embodiment, the connection part 55 is provided to extend toward the outside of the film capacitor 100. However, the connection part is not limited to this configuration. The connection part 55 may be provided to extend toward the inside of the film capacitor 100. When the connection part 55 extends inward, the mounting area of the film capacitor 100 can be reduced.

In the above-described embodiment described above, an example in which the fixing part 52 includes the extension 54 and the connection part 55 has been described, but the fixing part is not limited to this configuration. The fixing part 52 may have a shape extending from the flange 32 without bending.

In the above-described embodiment, an example in which the film capacitor 100 includes one fixing member 50 has been described, but the fixing member is not limited to this configuration. The fixing member 50 may be divided into two or more members.

Figure 8:
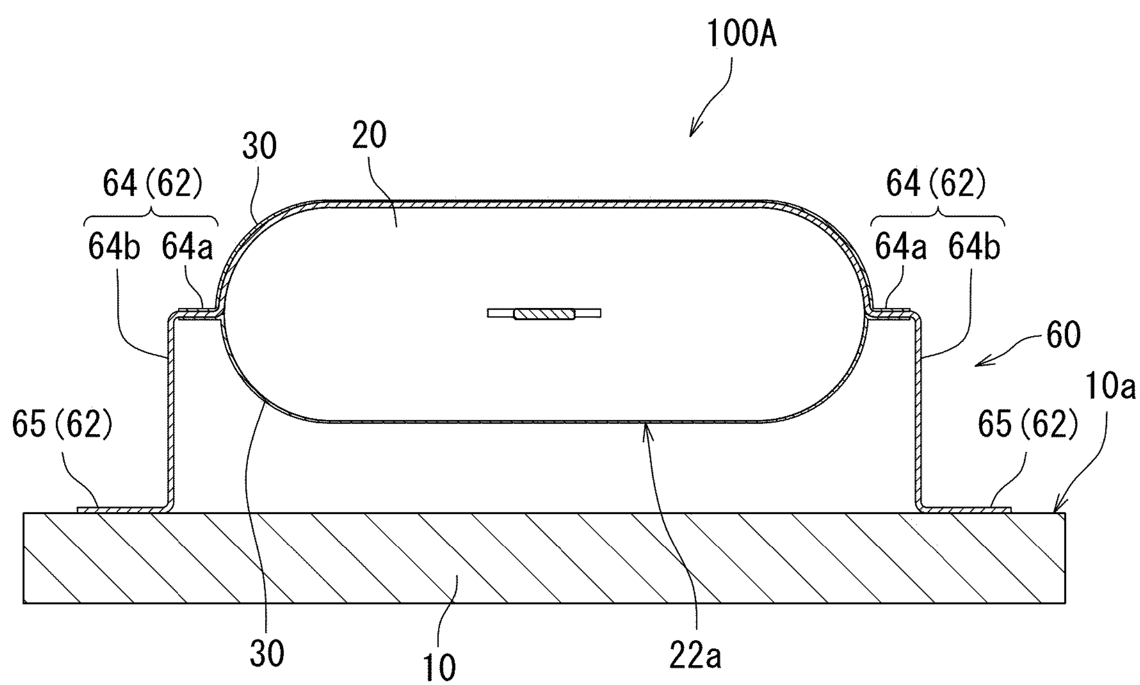
FIG. 8 is a sectional view of a film capacitor according to a first modification of the first embodiment.
Figure 8:
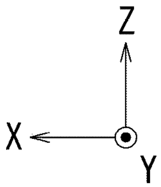

FIG. 8 is a sectional view of a film capacitor according to a first modification of the first embodiment. As illustrated in FIG. 8, one flat part 22*a* of the capacitor element 20 does not have to be in contact with the mounting surface 10*a* of the casing 10. Adjusting the height of the second extension 64*b* of the fixing part 62 of the fixing member 60 makes it possible to adjust the distance between the one flat part 22*a* of the capacitor element 20 and the mounting surface 10*a* of the casing 10. In this case, an implementation state suitable for the surrounding thermal environment can be realized. In addition, it is possible to effectively utilize the space between the flat part 22*a* of the capacitor element 20 and the casing 10, for example, by disposing a structure such as another component.

Figure 9:
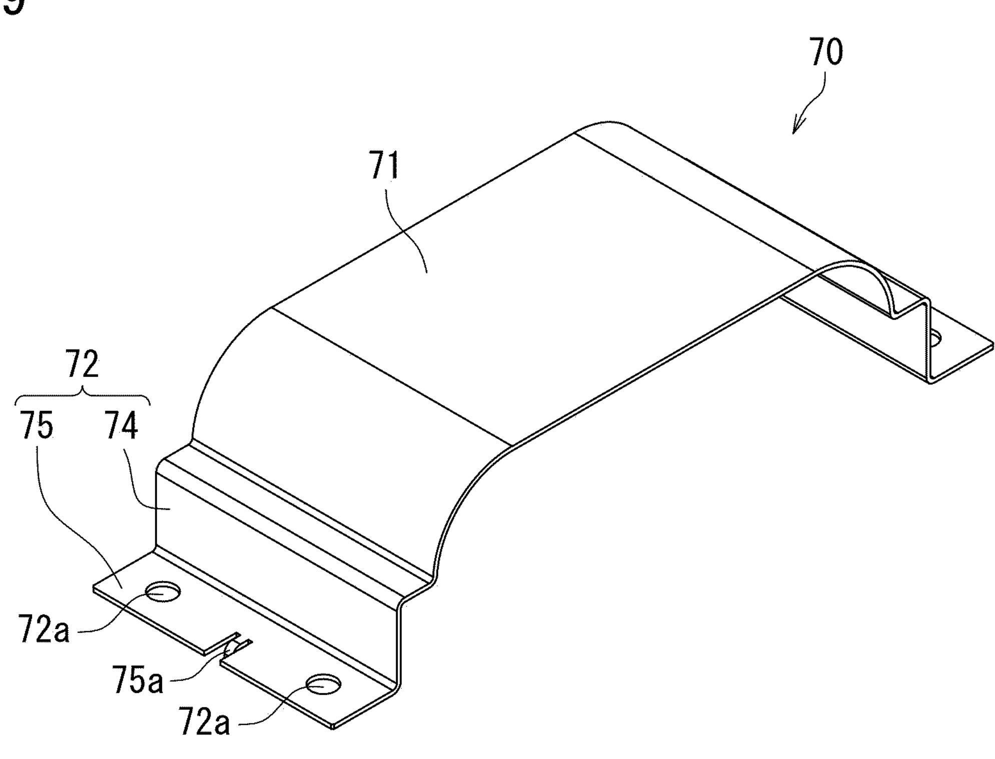
FIG. 9 is a perspective view of a fixing member of a film capacitor according to a second modification of the first embodiment.
Figure 9:
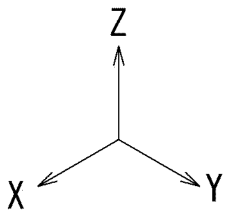

FIG. 9 is a perspective view of a fixing member of a film capacitor according to a second modification of the first embodiment. As illustrated in FIG. 9, a positioning projection 75*a* for positioning the film capacitor on the casing may be provided on the connection part 75 of the fixing member 70. In addition, the hole 72*a* provided in the fixing part 72 may be used as a hole for positioning.

Similarly to the fixing member 50 of the first embodiment, the fixing member 70 includes a main body 71 and a fixing part 72. The fixing part 72 includes an extension 74 and a connection part 75.

For example, the film capacitor can be easily positioned in the casing by inserting the positioning projection 75*a* into a positioning hole (not illustrated) provided in the casing 10. Alternatively, the film capacitor can be easily positioned in the casing 10 by inserting a positioning projection (not illustrated) provided on the casing into the positioning hole 72*a* provided in the connection part 75.

Second Embodiment

A power converter 1 and a film capacitor 200 according to a second embodiment of the present disclosure will be described. In the second embodiment, points different from the first embodiment will be mainly described. In the second embodiment, the same or equivalent configurations as those of the first embodiment will be described with the same reference numerals. In the second embodiment, the description overlapping with the first embodiment is omitted.

Figure 10:
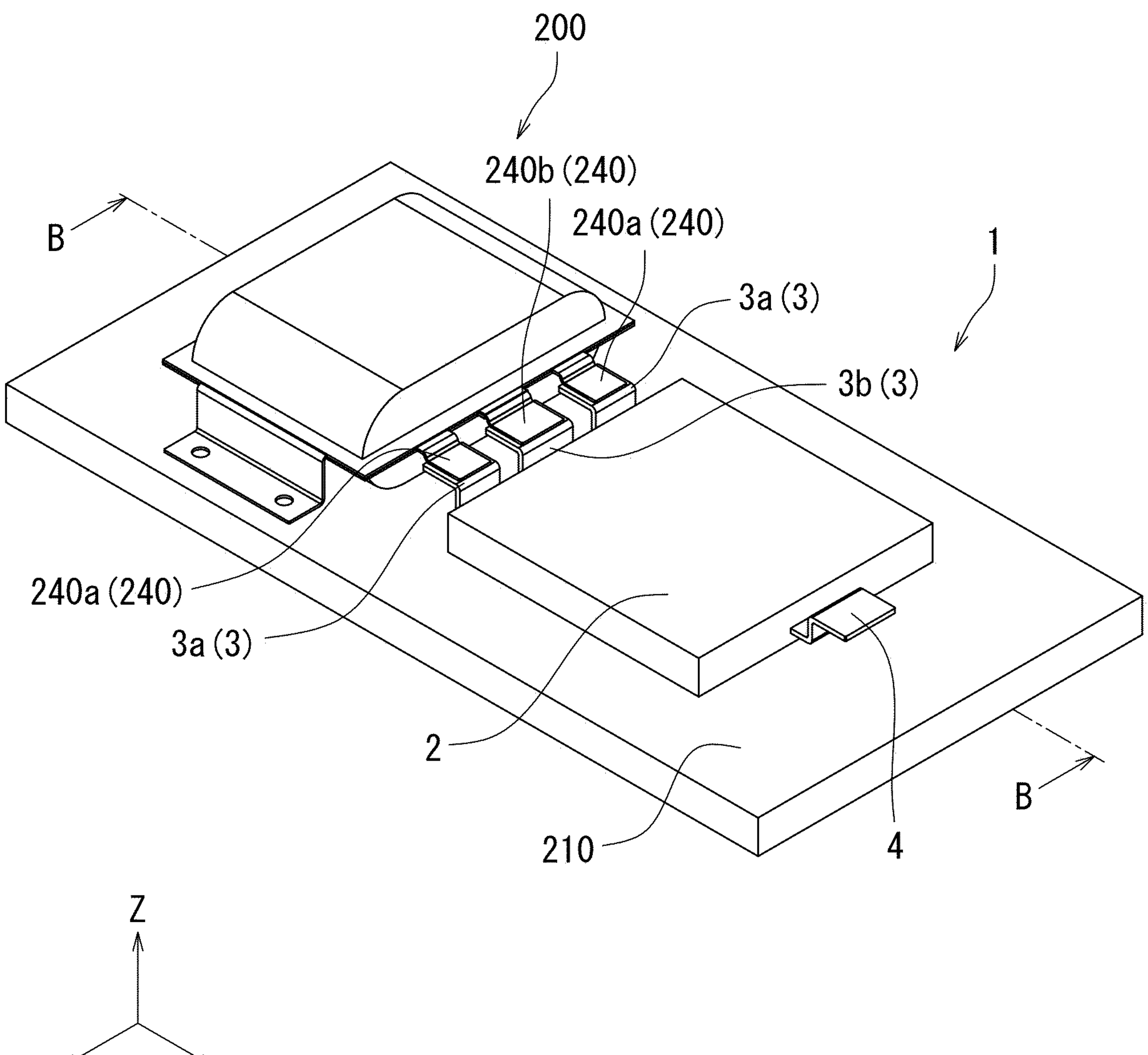
FIG. 10 is a perspective view of a power converter according to an second embodiment.
Figure 11:
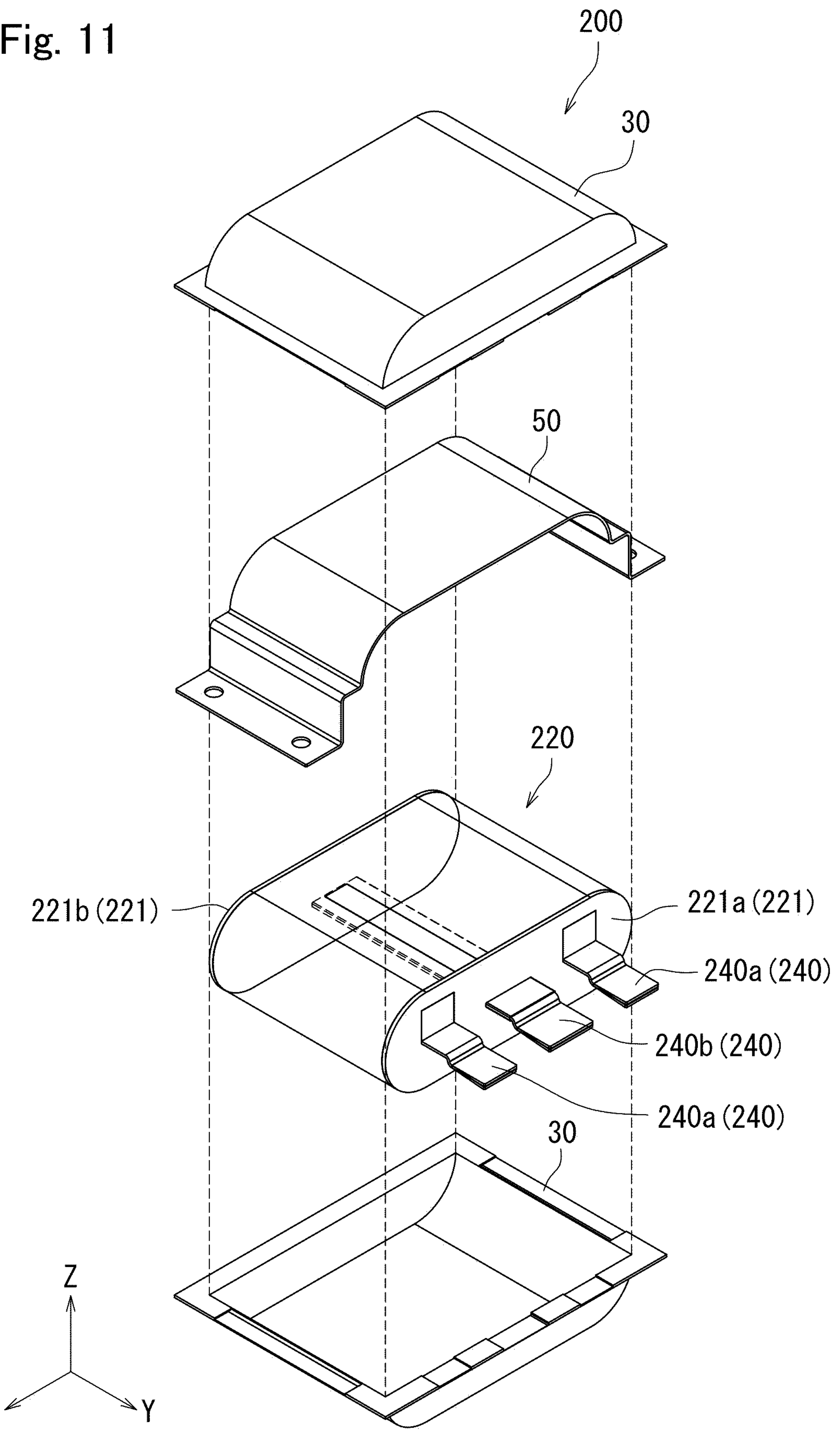
FIG. 11 is an exploded perspective view of the film capacitor disposed in the power converter of FIG. 10.

FIG. 10 is a perspective view of a power converter according to the second embodiment. FIG. 11 is an exploded perspective view of the film capacitor disposed on the power converter of FIG. 10. The second embodiment is different from the first embodiment in the shape and disposition of the terminal electrodes 240. In the second embodiment, the power converter 1 mounted with the film capacitor 200 will be described.

As illustrated in FIG. 10, the power converter 1 includes a power module 2, the film capacitor 200, and a casing 210.

The power module 2 is a module that converts a direct current and an alternating current to control a frequency and a voltage. The power module 2 has a plurality of terminal electrodes 3, and each of the terminal electrodes 3 is connected to corresponding one of the terminal electrodes 240 of the capacitor element 220. By connecting the terminal electrode 240 of the capacitor element 220 and the terminal electrode 3 of the power module 2, the capacitor element 220 and the power module 2 are electrically connected.

As illustrated in FIG. 11, in the capacitor element 220, end surface electrodes 221 include a first end surface electrode 221*a* provided on one end surface and a second end surface electrode 221*b* provided on the other end surface. The terminal electrodes 240 include two first terminal electrodes 240*a* electrically connected to the first end surface electrode 221*a* and one second terminal electrode 240*b* electrically connected to the second end surface electrode 221*b*. One end of the second terminal electrode 240*b* is connected to the second end surface electrode 221*b*, penetrates the inside of the capacitor element 220, and is exposed from the first end surface electrode 221*a*. Insulating coating is applied to a portion of the second terminal electrode 240*b* penetrating the inside of the capacitor element 220. Such a configuration of the capacitor element 220 contributes to lowering of ESL.

The terminal electrode 3 of the power module 2 in FIG. 10 includes two first terminal electrodes 3*a* connected to the two first terminal electrodes 240*a* of the capacitor element 220, and one second terminal electrode 3*b* connected to the one second terminal electrode 240*b* of the capacitor element 220. The power module 2 has a third terminal electrode 4 connected to an external device.

Figure 12:
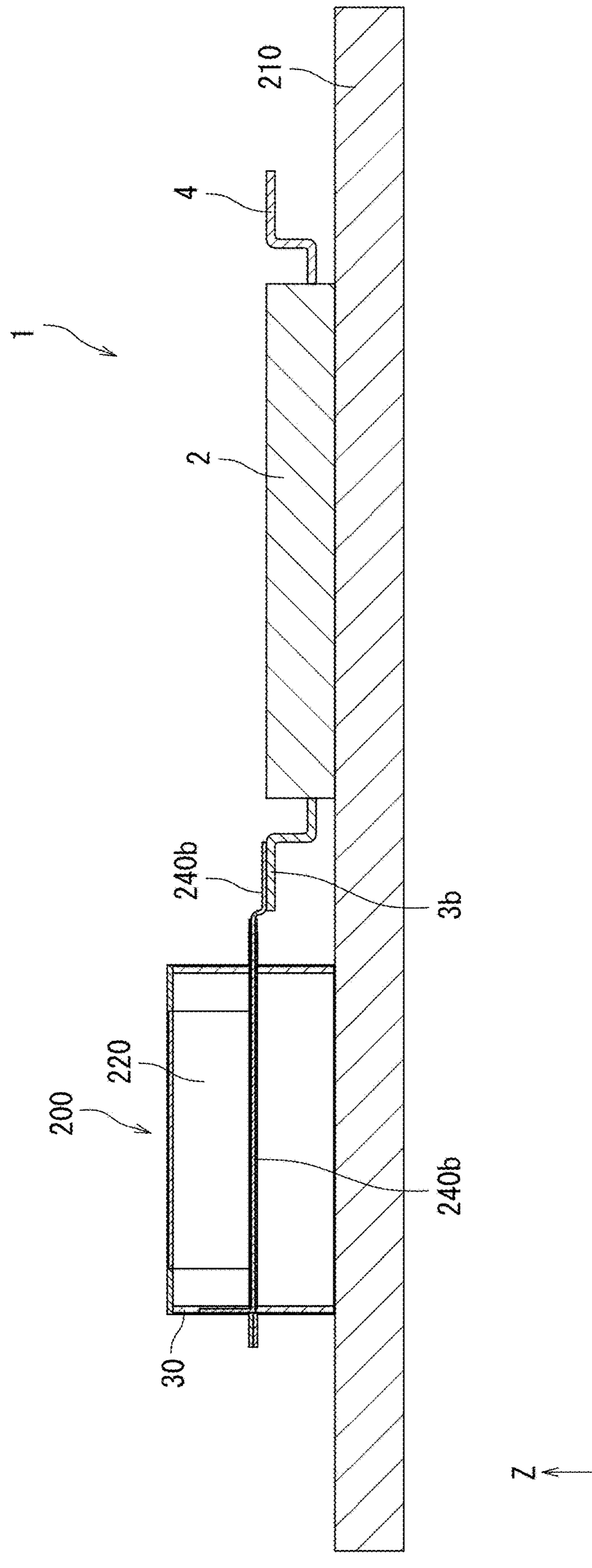
FIG. 12 is a B-B sectional view of the power converter of FIG. 10.

FIG. 12 is a B-B sectional view of the power converter of FIG. 10. As illustrated in FIG. 12, the second terminal electrode 240*b* of the capacitor element 220 and the second terminal electrode 3*b* of the power module 2 overlap and are connected in the height direction (Z direction). In the present embodiment, after the power module 2 is disposed on the casing 210, the film capacitor 200 is disposed on the casing 210 from above (Z direction), which makes it possible to cause the second terminal electrode 240*b* of the capacitor element 220 to overlap the second terminal electrode 3*b* of the power module 2. The first terminal electrode 3*a* of the power module 2 and the first terminal electrode 240*a* of the capacitor element 220 also overlap each other in the height direction. By disposing the film capacitor 200 on the casing 210, the fixing member 50 is disposed on the casing 210, and the terminal electrode 240 of the capacitor element 220 is placed on the terminal electrode 3 of the power module 6. That is, by placing the film capacitor 200 on the casing 210, disposition to the casing 210 and connection to the terminal electrode 3 of the power module 6 can be performed.

Figure 13:
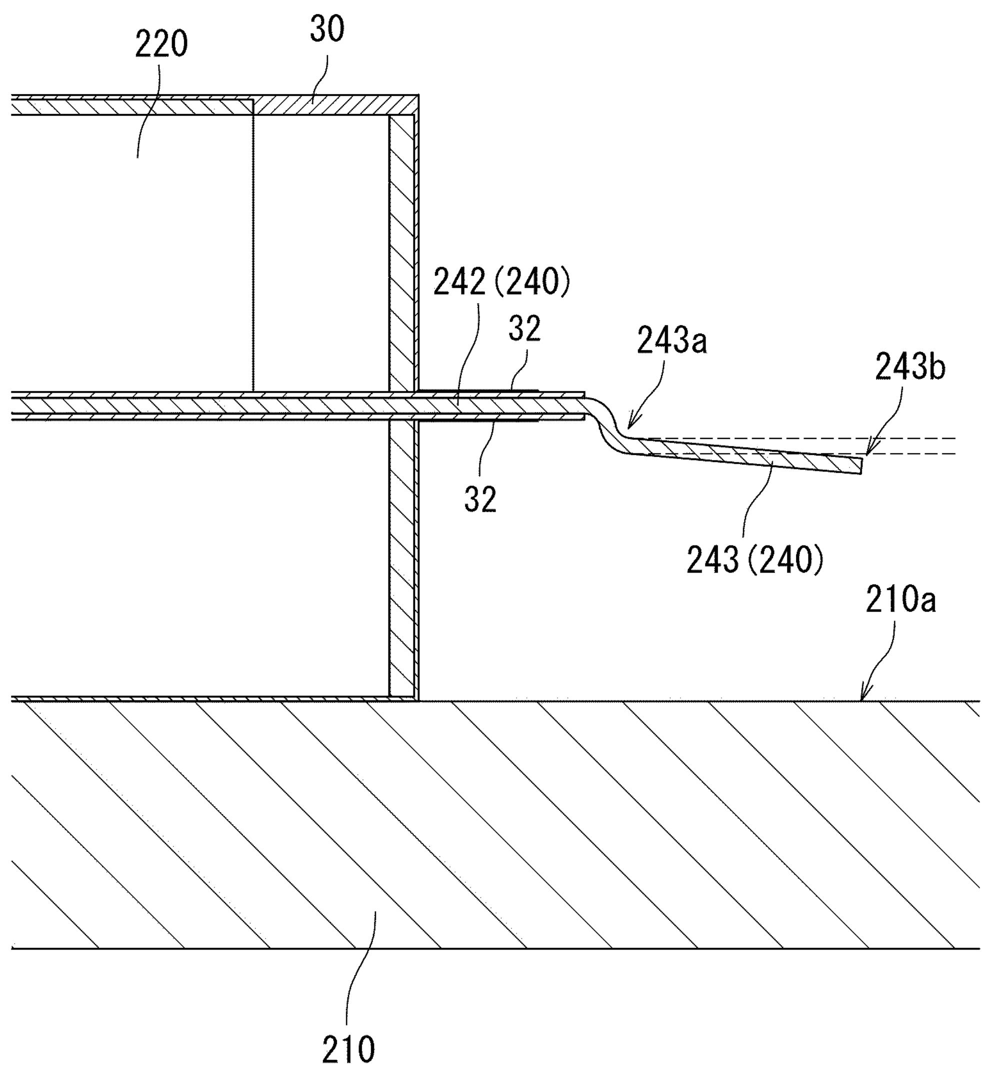
FIG. 13 is a partial sectional view of the film capacitor of FIG. 11.
Figure 13:
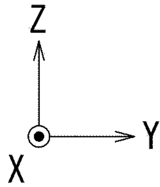

FIG. 13 is a partial sectional view of the film capacitor of FIG. 11. FIG. 13 illustrates the film capacitor 200 before being mounted on the casing 210. For the sake of description, the casing 210 is also illustrated in FIG. 13. As illustrated in FIG. 13, the terminal electrode 240 of the capacitor element 220 has a base 242 extending from the end surface electrode 221 along the flange 32, and an offset part 243 inclined from the base 242 toward the casing 210. The offset part 243 is inclined toward the casing 210 from a direction along the mounting surface 210*a* of the casing 210. That is, the positions in the height direction (Z direction) of one end 243*a* and the other end 243*b* of the offset part 243 are different.

Since the terminal electrode 240 has the offset part 243, the terminal electrode 240 of the film capacitor 200 and the terminal electrode 3 of the power module 2 can be brought into contact with each other without a gap when the film capacitor 200 is disposed on the casing 210. Thus, the terminal electrodes can be connected to each other using a connection method requiring high dimensional accuracy such as laser welding. In addition, since the dimensional accuracy of the terminal electrode 240 can be relaxed, the production process of the power converter can be simplified and the production cost can be reduced.

Both the first terminal electrode 240*a* and the second terminal electrode 240*b* of the film capacitor 200 may include the base 242 and the offset part 243, or either one may include the base 242 and the offset part 243.

[Effects]

The above-described embodiment can exhibit the following effects.

The power converter 1 includes the power module 2, the film capacitor 200, and the casing 210. The film capacitor 200 is electrically connected to the power module 2. The casing 210 disposes the power module 2 and the film capacitor 200.

Such a configuration makes it possible to firmly fix the film capacitor 200 to the casing 210, which contributes to high heat resistance and improvement in reliability of the power converter 1.

In the film capacitor 200, the terminal electrode 240 has the base 242 extending from the end surface electrode 221 along the flange 32, and the offset part 243 inclined from the base 242 toward the casing 210.

With such a configuration, when the film capacitor 200 is disposed on the casing 210, the terminal electrode 240 of the film capacitor 200 and the terminal electrode 3 of the power module 2 can be brought into contact with each other without a gap. Thus, a connection method requiring high dimensional accuracy such as laser welding can be used. In addition, since the dimensional accuracy of the terminal electrode 240 of the film capacitor 200 can be relaxed, the production process can be simplified and the production cost can be reduced.

In the above-described embodiment, an example in which the offset part 243 is inclined toward the casing 210 has been described, but offset part is not limited to this configuration. For example, the offset part 243 may be inclined in a direction away from the casing 210. In this case, by disposing external devices such as the power module 2 from above after the film capacitor 200 is disposed on the casing 210, the terminal electrode 240 of the film capacitor 200 and the terminal electrode 3 of the power module 2 can be brought into contact with each other without a gap.

Third Embodiment

A film capacitor 300 according to a third embodiment of the present disclosure will be described. In the third embodiment, points different from the first embodiment will be mainly described. In the third embodiment, the same or equivalent configurations as those of the first embodiment will be described with the same reference numerals. In the third embodiment, the description overlapping with the first embodiment is omitted.

Figure 14:
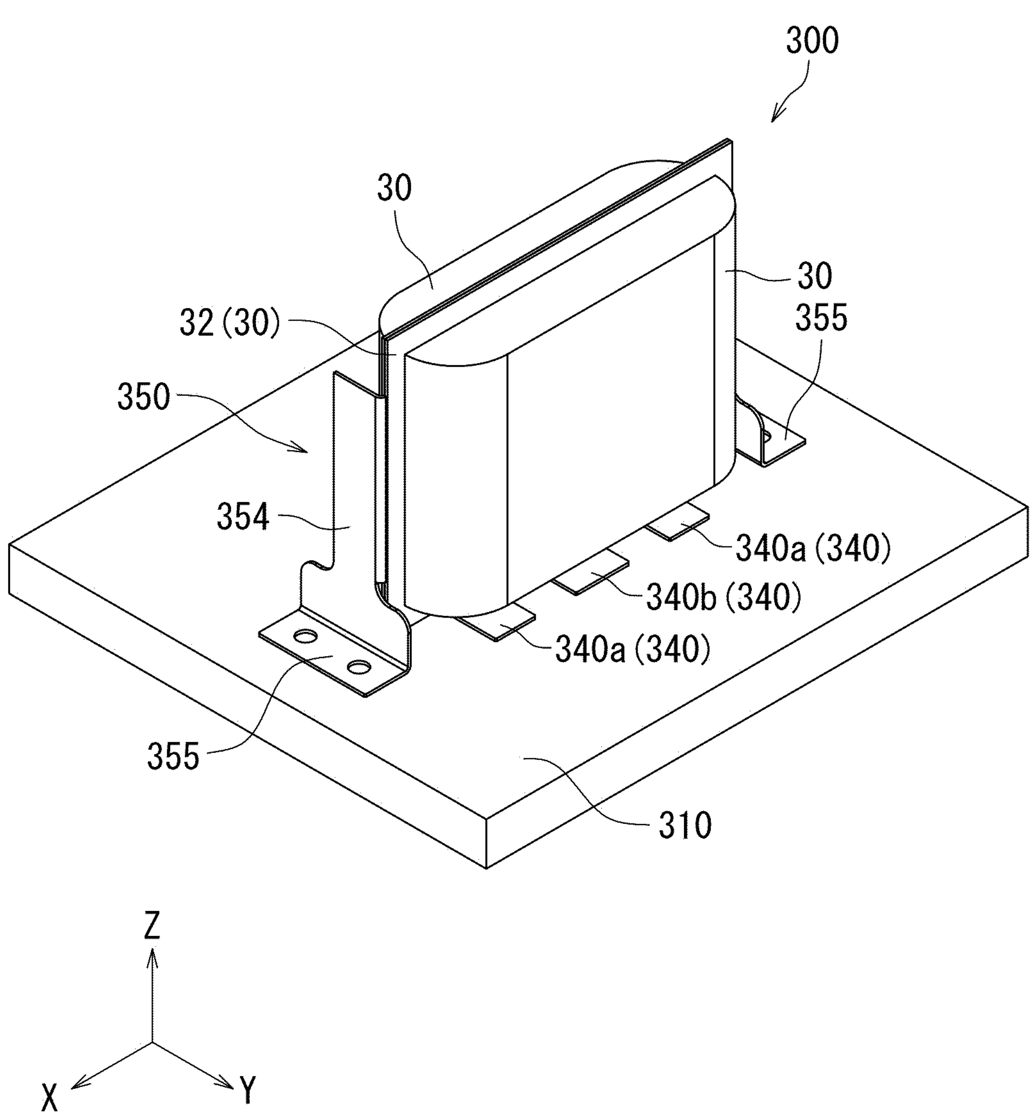
FIG. 14 is a perspective view of the film capacitor according to a third embodiment.
Figure 15:
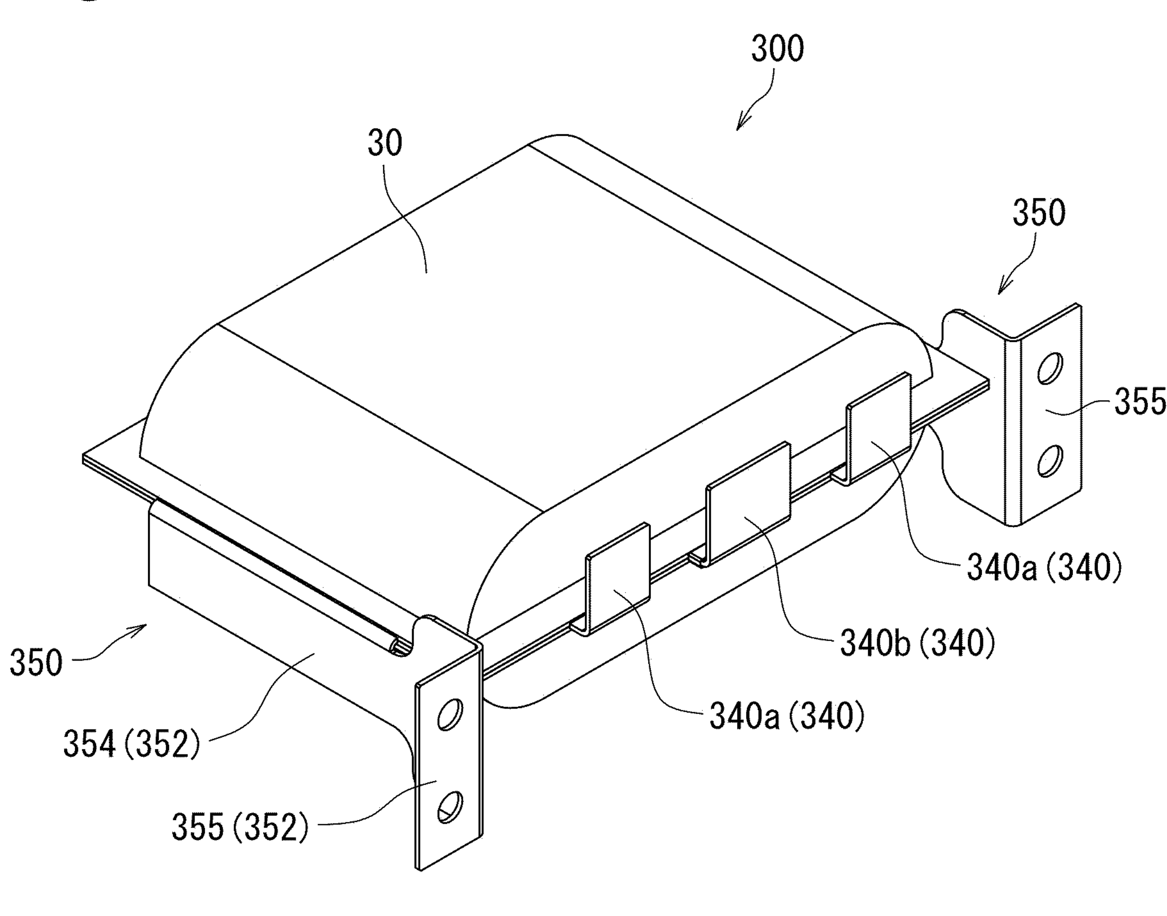
FIG. 15 is a view of the film capacitor of FIG. 14 as seen from another angle.
Figure 15:
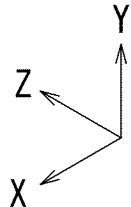
Figure 16:
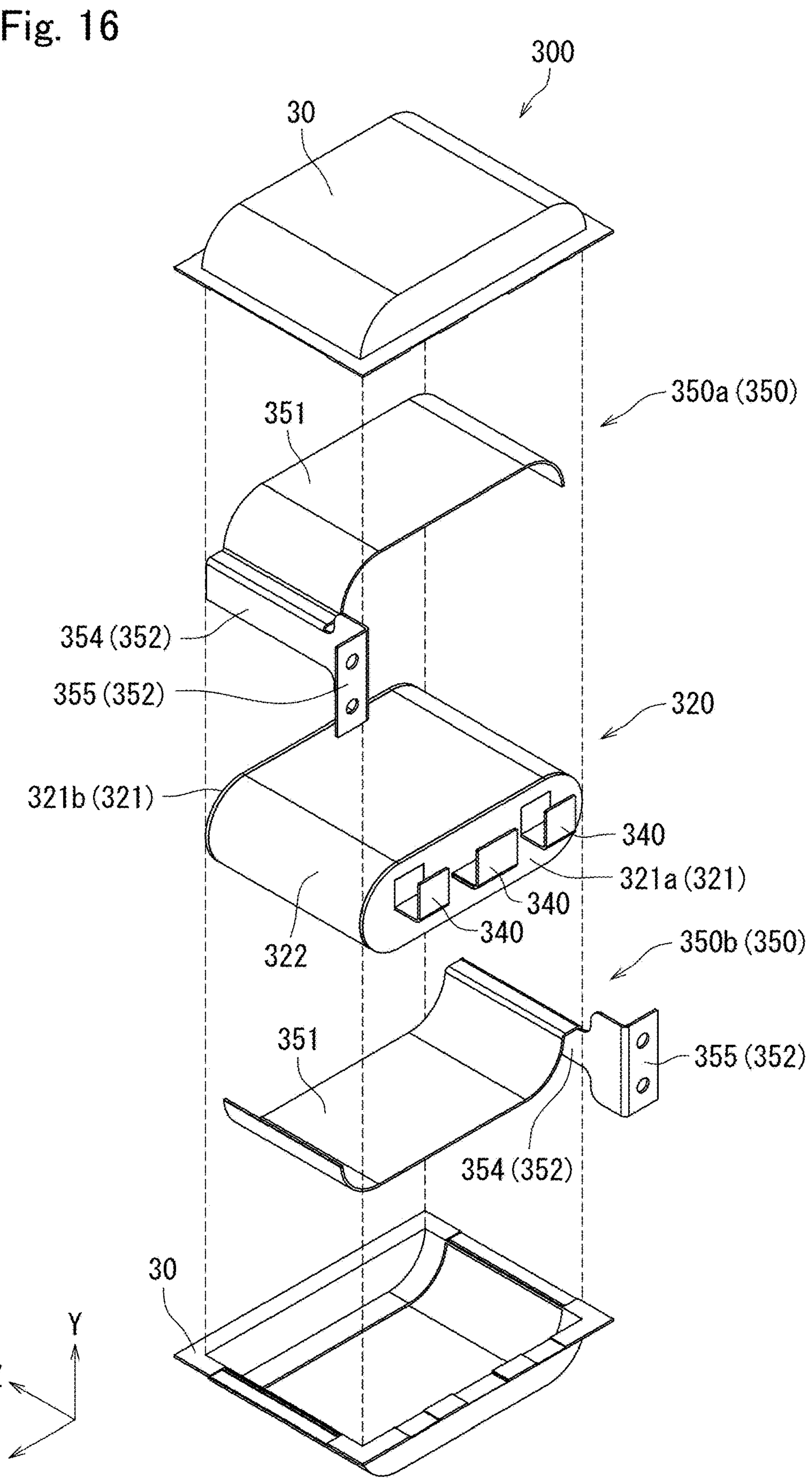
FIG. 16 is an exploded perspective view of the film capacitor of FIG. 15.

FIG. 14 is a perspective view of the film capacitor according to the third embodiment. FIG. 15 is a view of the film capacitor of FIG. 14 as seen from another angle. FIG. 16 is an exploded perspective view of the film capacitor of FIG. 15. The third embodiment is different from the first embodiment in the shape of a fixing member 350 and the shape of a terminal electrode 340 as illustrated in FIGS. 14 to 16.

As illustrated in FIGS. 14 to 16, in a film capacitor 300, the fixing member 350 is provided such that one end surface electrode 321 of the capacitor element 320 faces the mounting surface of a casing 310. In other words, a connection part 355 of the fixing part 352 of the fixing member 350 is disposed so as to extend in the direction along one end surface electrode 321 (first end surface electrode 321*a*). The extension 354 of the fixing part 352 extends in the height direction (Z direction) from the connection part 355 and is connected to the main body 351.

In the first embodiment and the second embodiment, the capacitor elements are horizontally disposed with respect to the casing. On the other hand, in the third embodiment, the capacitor element 320 is vertically disposed with respect to the housing 310 as illustrated in FIG. 14.

In the present embodiment, the fixing member 350 includes a first fixing member 350*a* and a second fixing member 350*b*. Since the first fixing member 350*a* and the second fixing member 350*b* can support the capacitor element 320 with a side surface 322 interposed therebetween, the film capacitor 300 can be stably fixed to the casing.

The terminal electrode 340 includes two first terminal electrodes 340*a* electrically connected to first end surface electrode 321*a* of the capacitor element 320, and one second terminal electrode 340*b* electrically connected to second end surface electrode 321*b*. One end of the second terminal electrode 340*b* is connected to the second end surface electrode 321*b*, penetrates the inside of the capacitor element 320, and is exposed from the first end surface electrode 321*a*. Insulating coating is applied to a portion of the second terminal electrode 340*b* penetrating the inside of the capacitor element 220.

The distal end portion of the terminal electrode 340 extends along the extending surface of the connection part 355 of the fixing member 350. Thus, the terminal electrode 340 and the connection part 355 of the fixing member 350 are disposed on the same plane.

[Effects]

The above-described embodiment can exhibit the following effects.

The connection part 355 of the fixing member 350 is disposed so as to extend in the direction along one end surface electrode 321. Such a configuration makes it possible to dispose the film capacitor 300 with the end surface electrode 321 of capacitor element 320 facing the casing, which can reduce the mounting area.

The fixing member 350 includes the first fixing member 350*a* and the second fixing member 350*b*. Each of the fixing members 350*a* and 350*b* includes the main body 351 and the fixing part 352 including the extension 354 and the connection part 355. The first fixing member 350*a* and the second fixing member 350*b* have the same shape. The first fixing member 350*a* and the second fixing member 350*b* can support the capacitor element 320 with the side surface 322 interposed therebetween. Thus, it is possible to stably fix the film capacitor 300 to the casing 310.

[Modifications]

Figure 17:
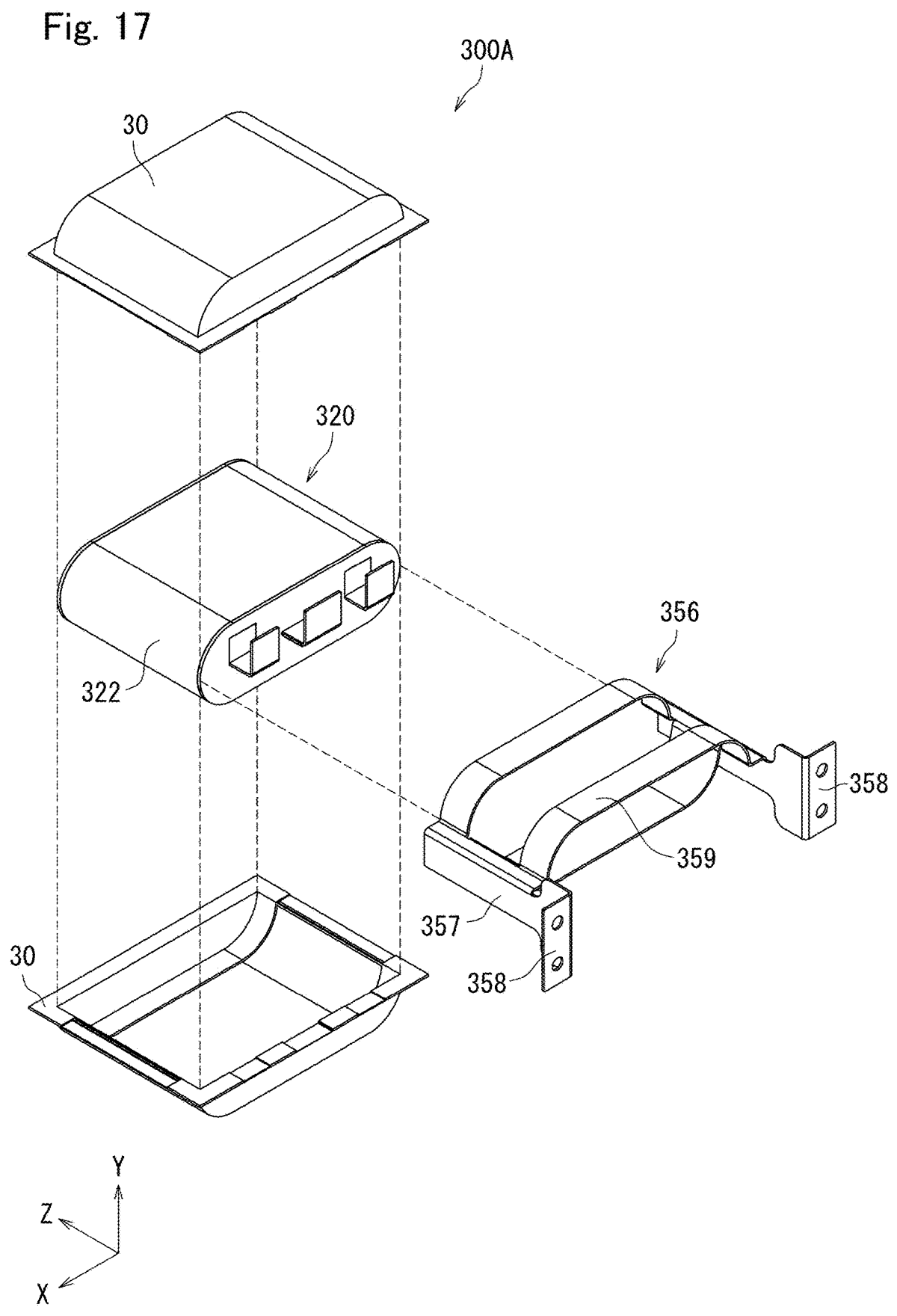
Figure 18A:
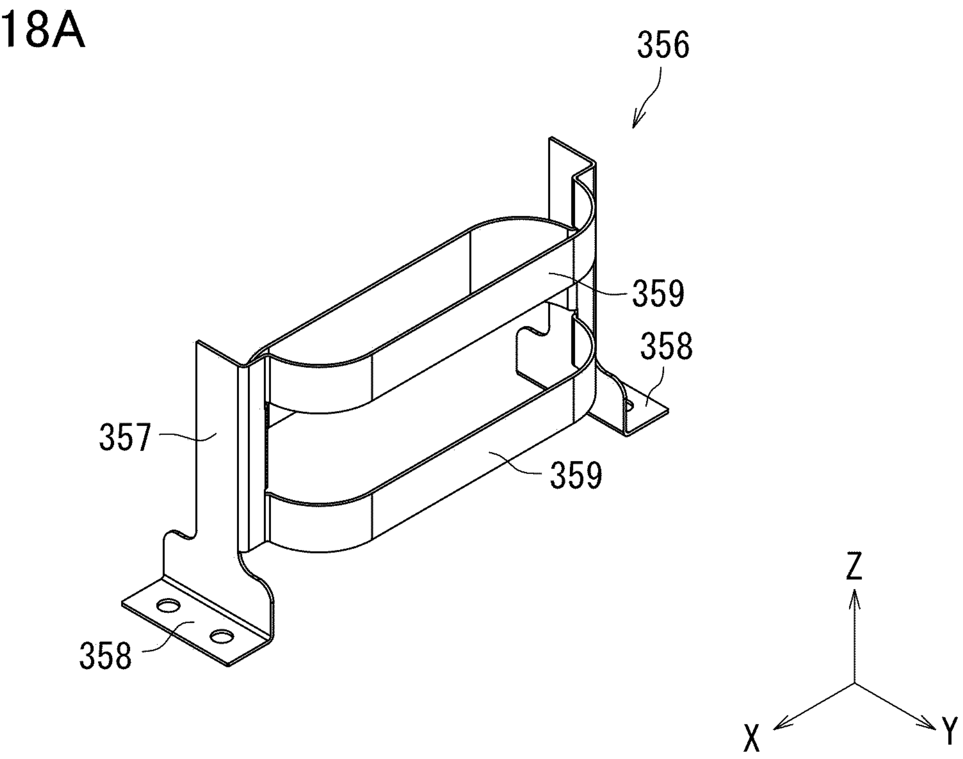
FIG. 18A is a perspective view of a fixing member of the film capacitor of FIG. 17.
Figure 18B:
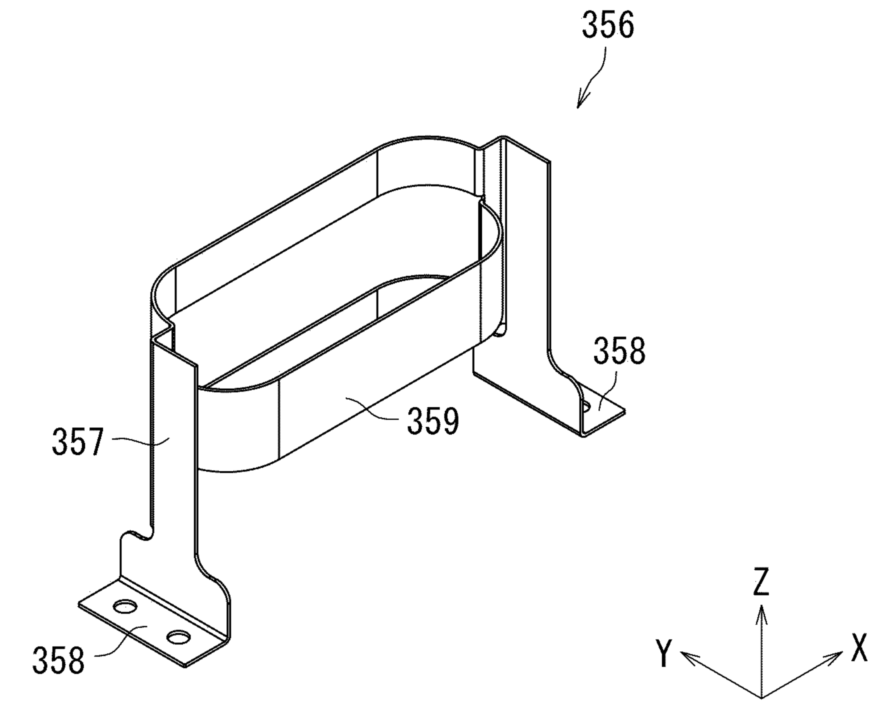
FIG. 18B is a view of the fixing member of FIG. 18A as seen from another angle.

FIG. 17 is an exploded perspective view of a film capacitor according to a first modification of the third embodiment. FIG. 18A is a perspective view of a fixing member of the film capacitor of FIG. 17. FIG. 18B is a view of the fixing member of FIG. 18A as seen from another angle. In a film capacitor 300A of the first modification, the shape of a fixing member 356 is different from the film capacitor 300 of the third embodiment.

As illustrated in FIGS. 17 to 18B, in the film capacitor 300A of the first modification, the fixing member 356 is formed of one fixing member including two extensions 357 and two connection parts 358. The two extensions 357 are connected by the main body 359 to form one fixing member 356.

Such a configuration makes it possible to hold the capacitor element 320 in such a manner as to surround the side surface 322 with one fixing member 356. Thus, it is possible to stably fix the film capacitor 300A to the casing.

Figure 19:
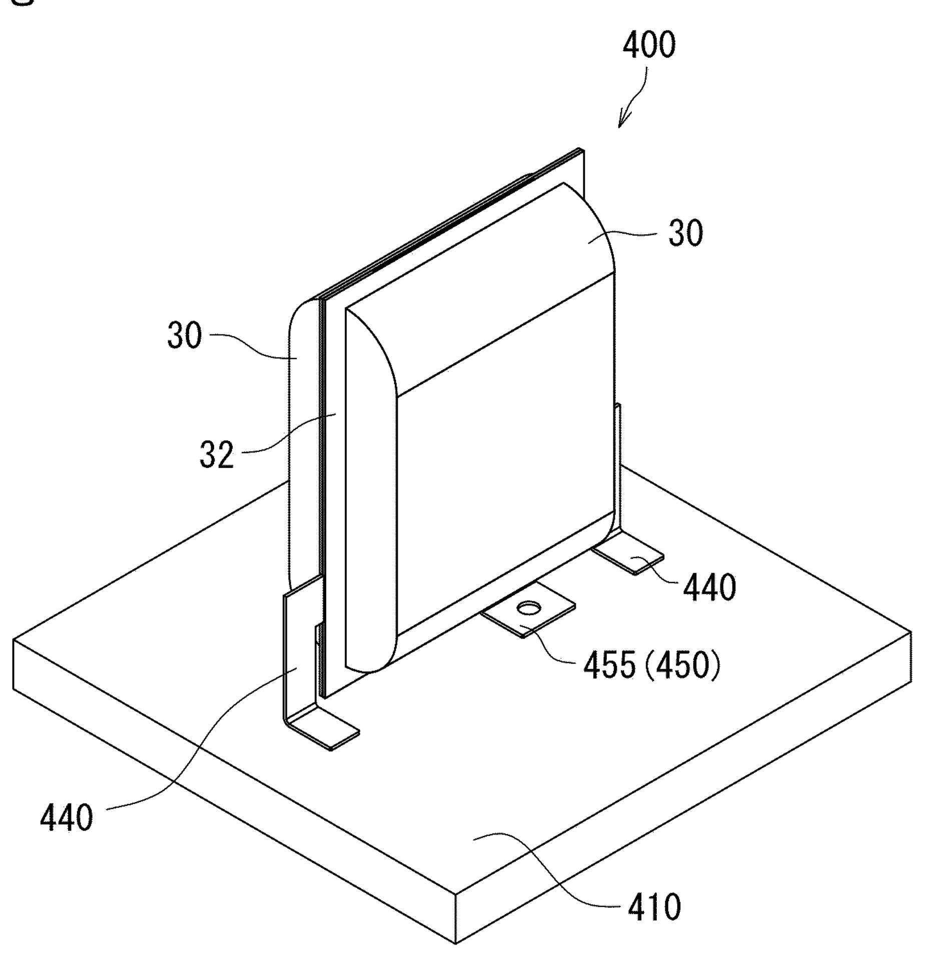
FIG. 19 is a perspective view of a film capacitor according to a second modification of the third embodiment.
Figure 19:
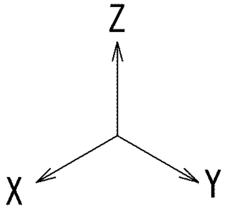
Figure 20:
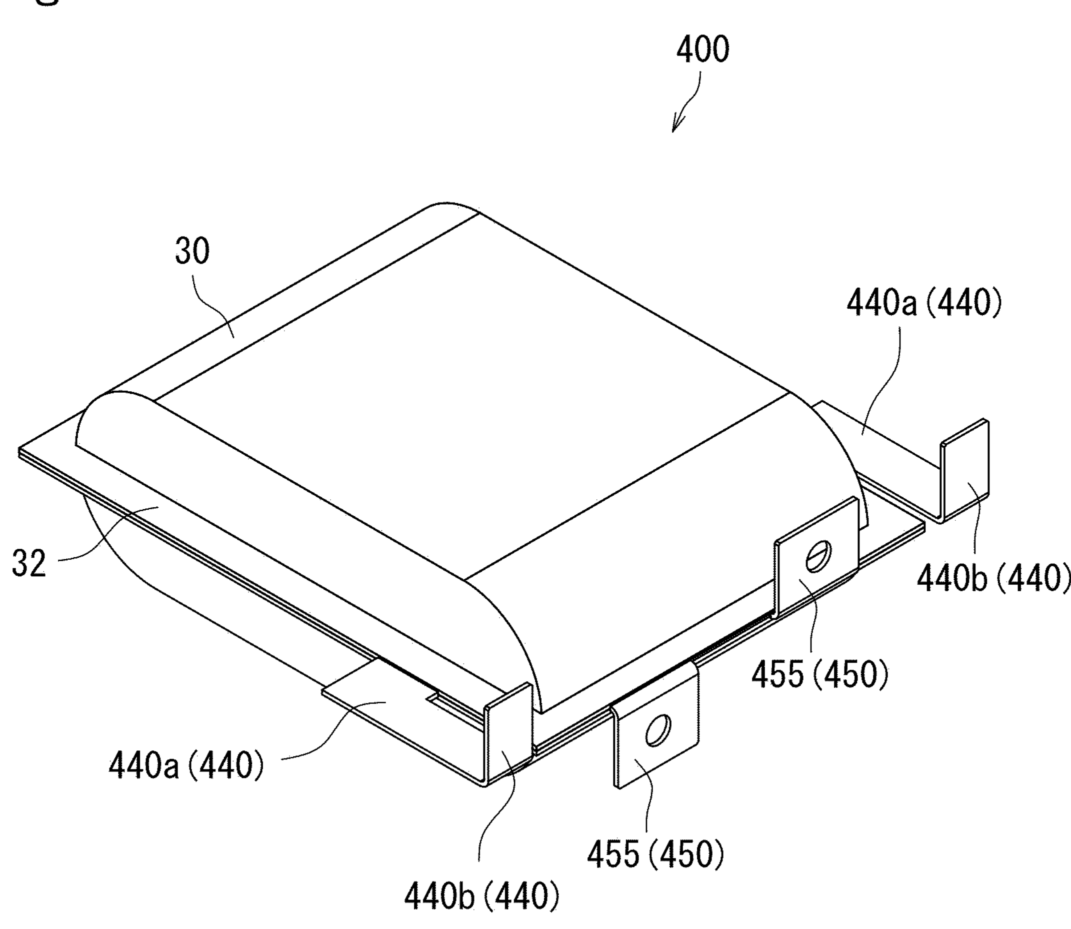
FIG. 20 is a view of the film capacitor of FIG. 19 as seen from another angle.
Figure 20:
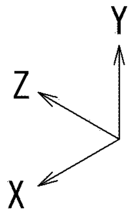
Figure 21:
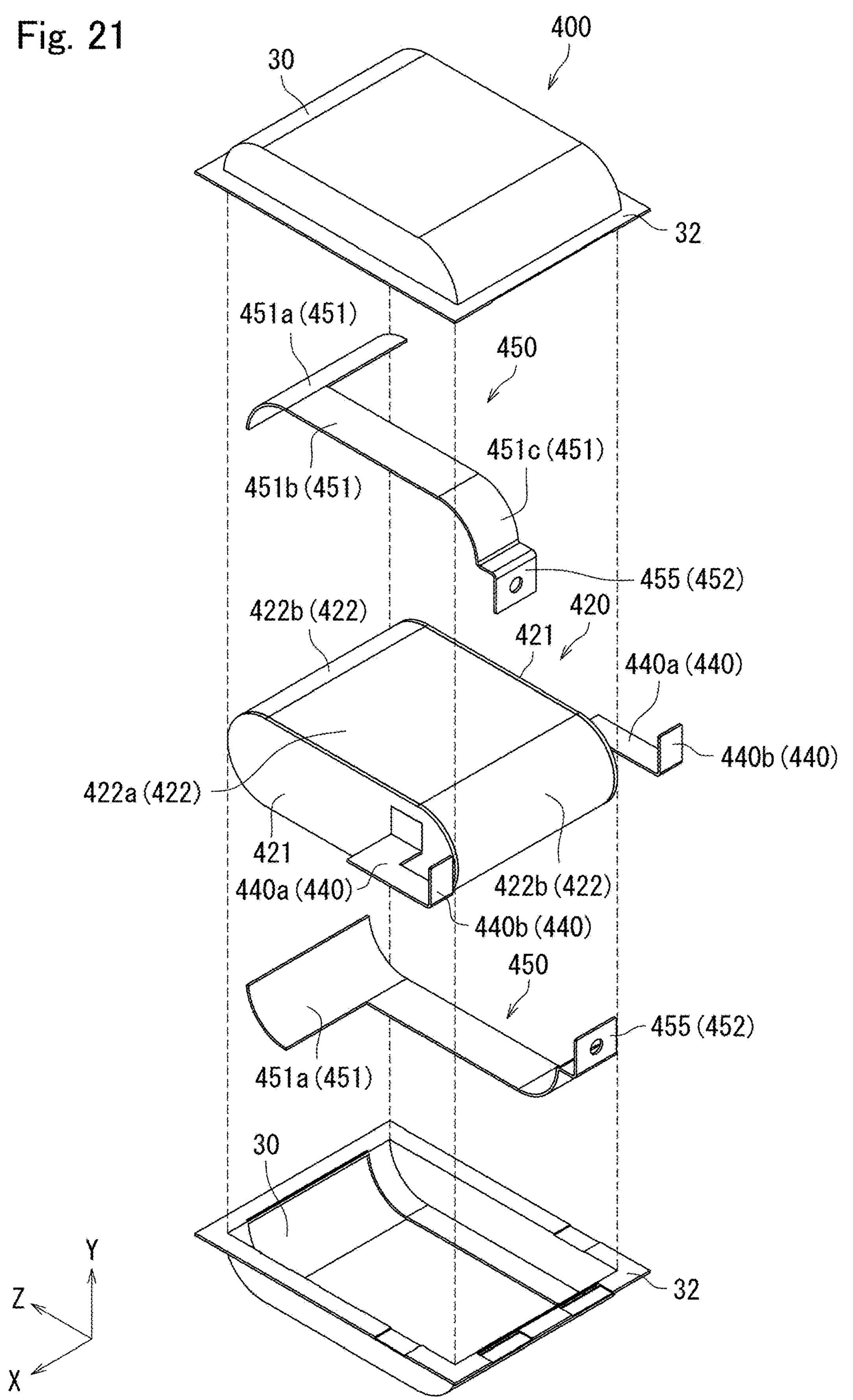
FIG. 21 is an exploded perspective view of the film capacitor of FIG. 20.

FIG. 19 is a perspective view of a film capacitor according to a second modification of the third embodiment. FIG. 20 is a view of the film capacitor of FIG. 19 as seen from another angle. FIG. 21 is an exploded perspective view of the film capacitor of FIG. 20. In a film capacitor 400 of the second modification, the shape of a terminal electrode 440 of a capacitor element 420 and the shape a the fixing member 450 are different from the film capacitor 300 of the third embodiment.

As illustrated in FIGS. 19 to 21, in the film capacitor 400, two fixing parts 452 of the fixing member 450 are exposed from the same side of the flange 32 of the laminate film 30. On the other hand, two terminal electrodes 440 of the capacitor element 420 are exposed from opposing sides of the flange 32 of the laminate film 30.

The fixing member 450 includes the main body 451 disposed along a side surface 422 of the capacitor element 420, and the fixing part 452 extending from the main body 451. The main body 451 includes a first part 451*a* in contact with one curved part 422*b* of the capacitor element 420, a second part 451*b* in contact with the flat part 422*a*, and a third part 541*c* in contact with the other curved part 422*b*. The fixing part 452 extends from the third part 451*c* of the main body 451. In the film capacitor 400 of the second modification, two fixing members 450 having the same shape are disposed. As illustrated in FIG. 18, the connection parts 455 of the respective fixing members 450 are disposed to extend in opposite directions. Extending the connection part 455 in the opposite directions makes it possible to improve stability when the connection part is disposed in the casing 410.

The capacitor element 420 has two terminal electrodes 440 respectively connected to two end surface electrodes 421. Each of the terminal electrodes 440 includes a first part 440*a* exposed to the outside of the flange 32 from the end surface electrode 421 and extending toward the casing, and a second part 440*b* extending along a surface of the fixing member 450 where the connection part 455 extends.

Such a configuration makes it possible to dispose the film capacitor 400 on the casing 410 such that the curved part 422*b* of the capacitor element 420 faces the casing 410. This, the mounting area can be reduced.

Figure 22:
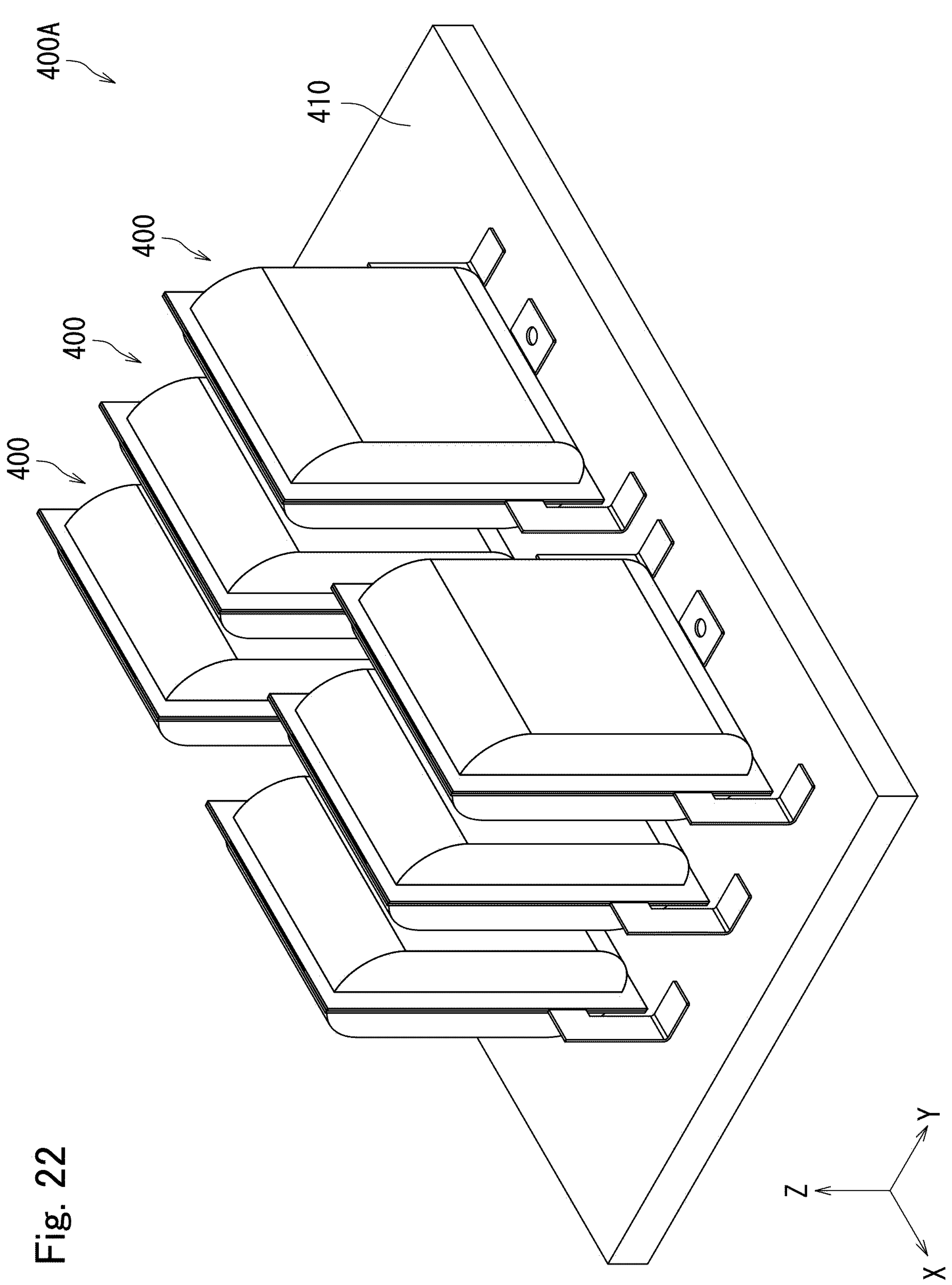
FIG. 22 is a view of a capacitor bank including six film capacitors.

FIG. 22 is a view of a capacitor bank including six film capacitors. In a capacitor bank 400A, six film capacitors 400 are connected in parallel and disposed in the casing 410. By connecting the plurality of film capacitors 400 in parallel and disposing them in one casing 410, the capacitor bank 400A having a desired capacitance can be provided.

Fourth Embodiment

A power converter 5 and a film capacitor 500 according to a fourth embodiment of the present disclosure will be described. In the fourth embodiment, points different from the second embodiment will be mainly described. In the fourth embodiment, the same or equivalent configurations as those of the second embodiment will be described with the same reference numerals. In the fourth embodiment, the description overlapping with the second embodiment is omitted.

Figure 23:
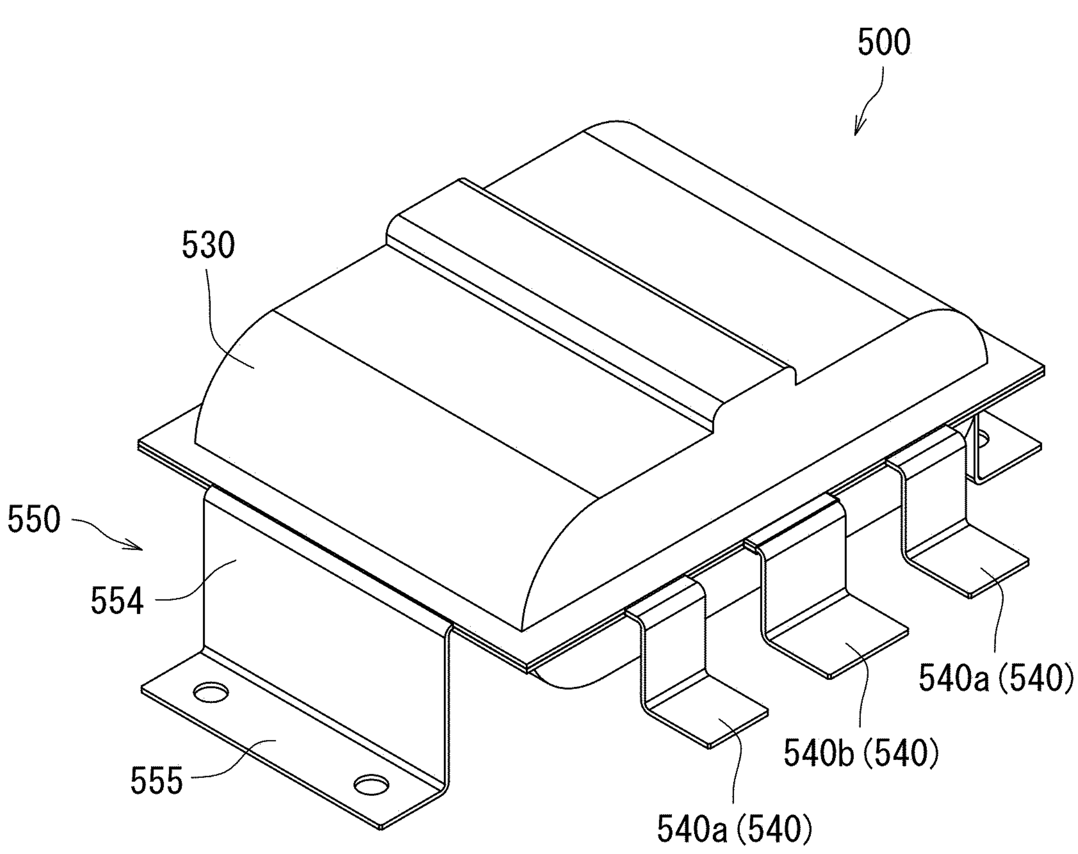
FIG. 23 is a perspective view of a film capacitor according to a fourth embodiment.
Figure 23:
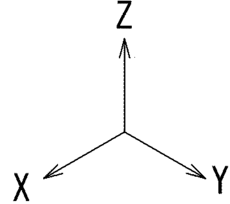
Figure 24:
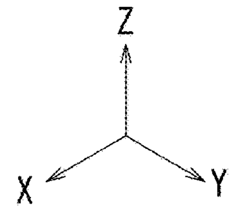
FIG. 24 is a view of the film capacitor of FIG. 23 without a laminate film.
Figure 25:
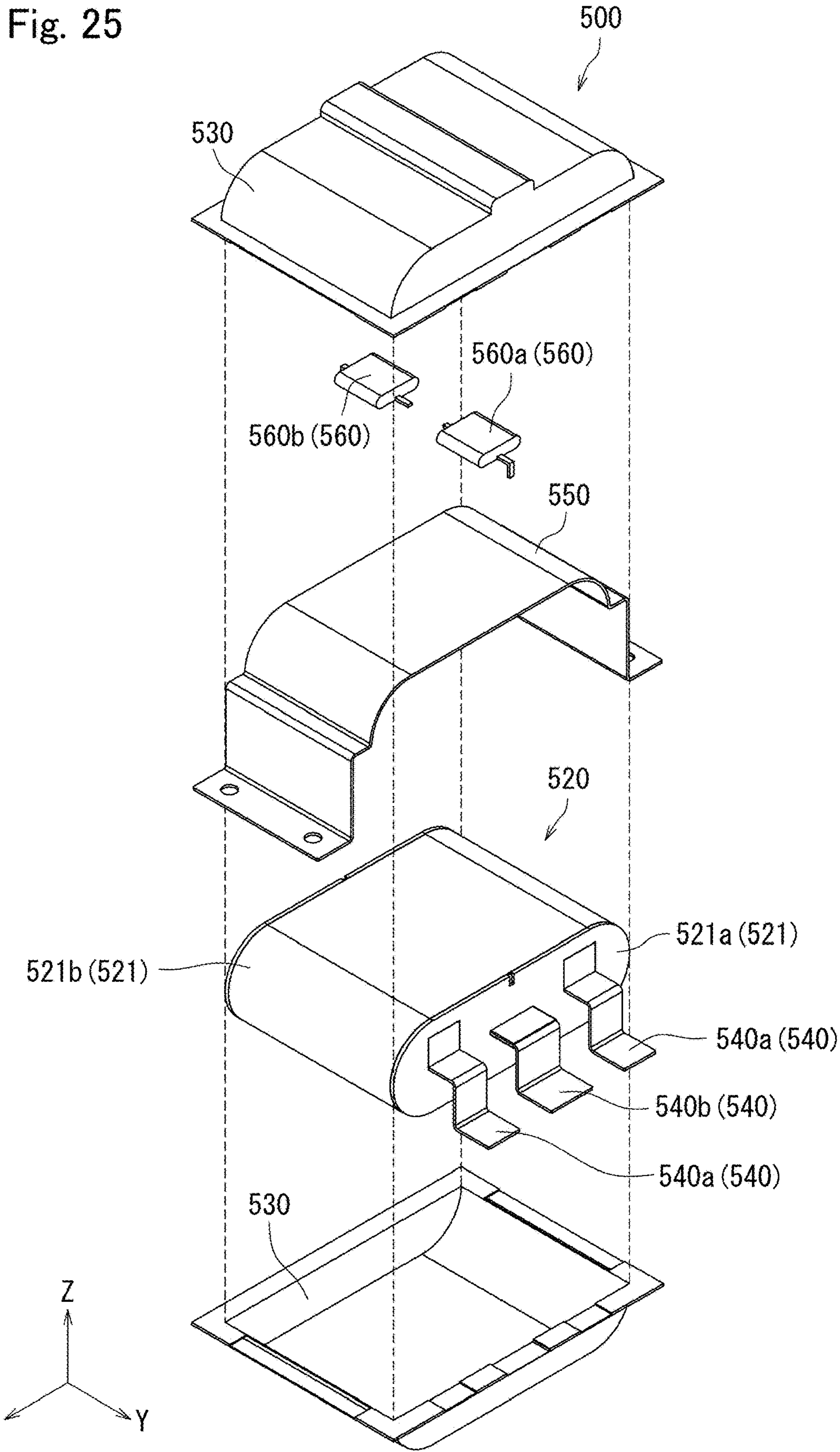
FIG. 25 is an exploded perspective view of the film capacitor of FIG. 23.
Figure 26:
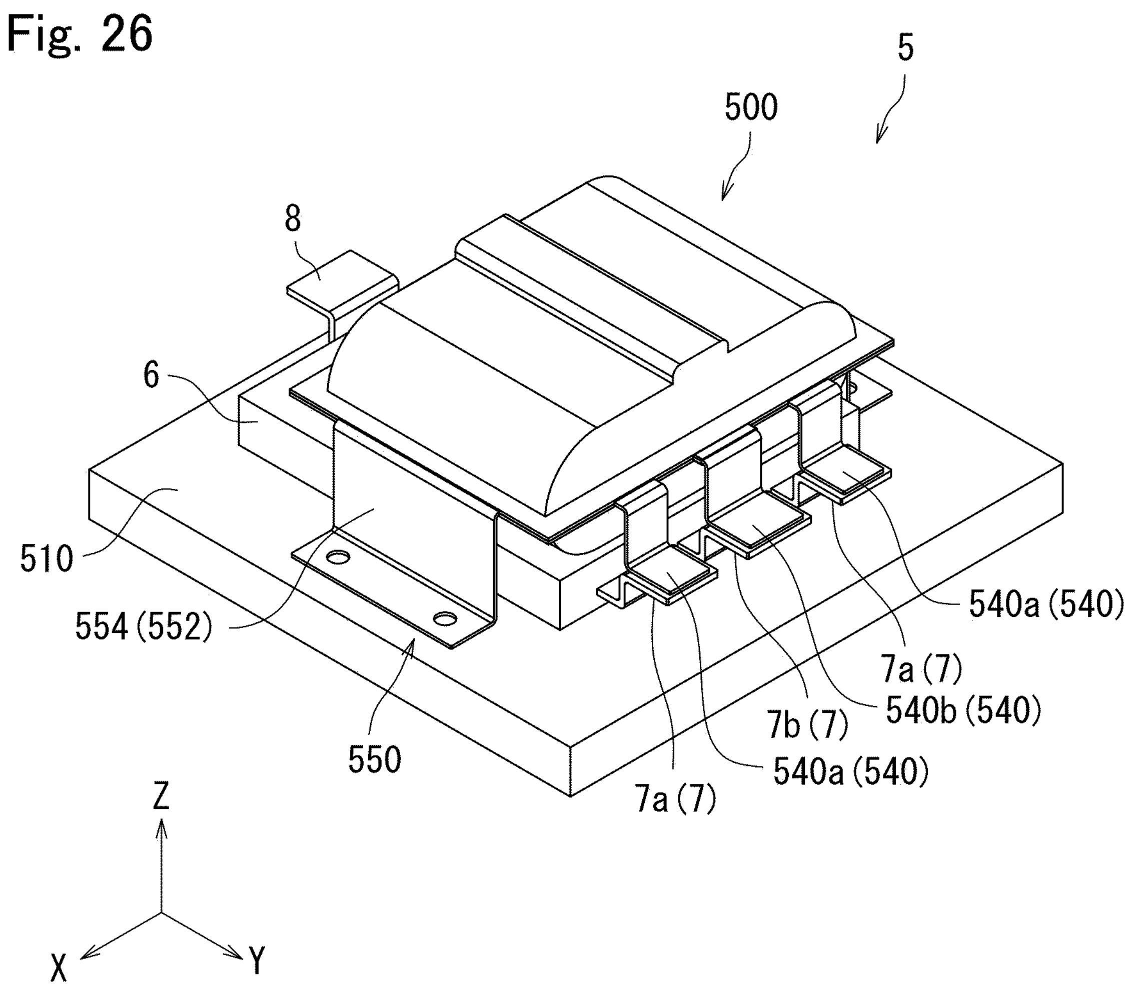
FIG. 26 is a perspective view of a power converter of mounted with the film capacitor of FIG. 23.

FIG. 23 is a perspective view of a film capacitor according to the fourth embodiment. FIG. 24 is a view of the film capacitor of FIG. 23 without a laminate film. FIG. 25 is an exploded perspective view of the film capacitor of FIG. 23. FIG. 26 is a perspective view of a power converter mounted with the film capacitor of FIG. 23. The fourth embodiment is different from the second embodiment in that the film capacitor 500 includes a Y capacitor 560 as illustrated in FIGS. 23 to 25. The fourth embodiment is different from the second embodiment in that a power module 6 is disposed between a casing 510 and the film capacitor 500 as illustrated in FIG. 26 in the power converter 5.

As illustrated in FIGS. 23 to 25, the film capacitor 500 includes the Y capacitor 560 that connects an end surface electrode 521 of the capacitor element 520 and a fixing member 550. In the present embodiment, the fixing member 550 is made of a material having conductivity. Thus, the fixing member 550 functions as a ground terminal. Disposing the Y capacitor makes it possible to remove common mode noise.

In the present embodiment, the Y capacitor 560 includes a first Y capacitor 560*a* connected to a first end surface electrode 521*a* of the capacitor element 520, and a second Y capacitor 560*b* connected to a second end surface electrode 521*b* of the capacitor element 520. Although the Y capacitor 560 is disposed in the main body 551 of the fixing member 550, the Y capacitor 560 is not necessarily disposed in the main body 551, and may be disposed in the fixing part 552.

Alternatively, instead of the Y capacitor, a sheet-shaped dielectric body may be disposed between the capacitor element 520 and the fixing member 550, and a Y capacitor capacitance may be formed between the fixing member 550 and the end surface electrode 521.

As illustrated in FIG. 26, the power converter 5 of the fourth embodiment includes the power module 6, the film capacitor 500, and the casing 510. The power module 6 is disposed between the film capacitor 500 and the casing 510.

The power module 6 has a terminal electrode 7 connected to a terminal electrode 540 of the capacitor element 520. More specifically, the power module 6 includes two first terminal electrodes 7*a* connected to two first terminal electrodes 540*a* of the capacitor element 520, and one second terminal electrode 7*b* connected to one second terminal electrode 540*b*. The power module 6 has a third terminal electrode 8 connected to an external device.

In the present embodiment, the film capacitor 500 is disposed on the power module 6 so as to cover the power module 6 disposed on the casing 510. When the film capacitor 500 is disposed on the power module 6, each terminal electrode is provided such that the terminal electrode 7 of the power module 6 and the terminal electrode 540 of the film capacitor 500 are in contact with each other.

By adjusting the length of the extension 554 of the fixing member 550 of the film capacitor 500 in the Z direction according to the size or height of the power module 6, the terminal electrode 540 of the film capacitor 500 and the terminal electrode 7 of the power module 6 can be easily brought into contact with each other.

[Effects]

The above-described embodiment can exhibit the following effects.

In the film capacitor 500, the fixing member 550 is made of a material having conductivity. With such a configuration, the fixing member 550 can be used as a connection terminal.

The film capacitor 500 further includes the Y capacitor 560 that connects the end surface electrode 521 and the fixing member 550, and the fixing member 550 functions as a ground terminal. Such a configuration makes it possible to integrate the Y capacitor with the film capacitor 500, which can downsize the device. In addition, the mounting cost can be reduced. Further, the fixing member 550 can be used as a ground terminal.

In the power converter 5, the power module 6 is disposed between the film capacitor 500 and the casing 510. Such a configuration can reduce the mounting area, which contributes to downsizing and weight reduction of the power converter 5.

[Modifications]

Figure 27:
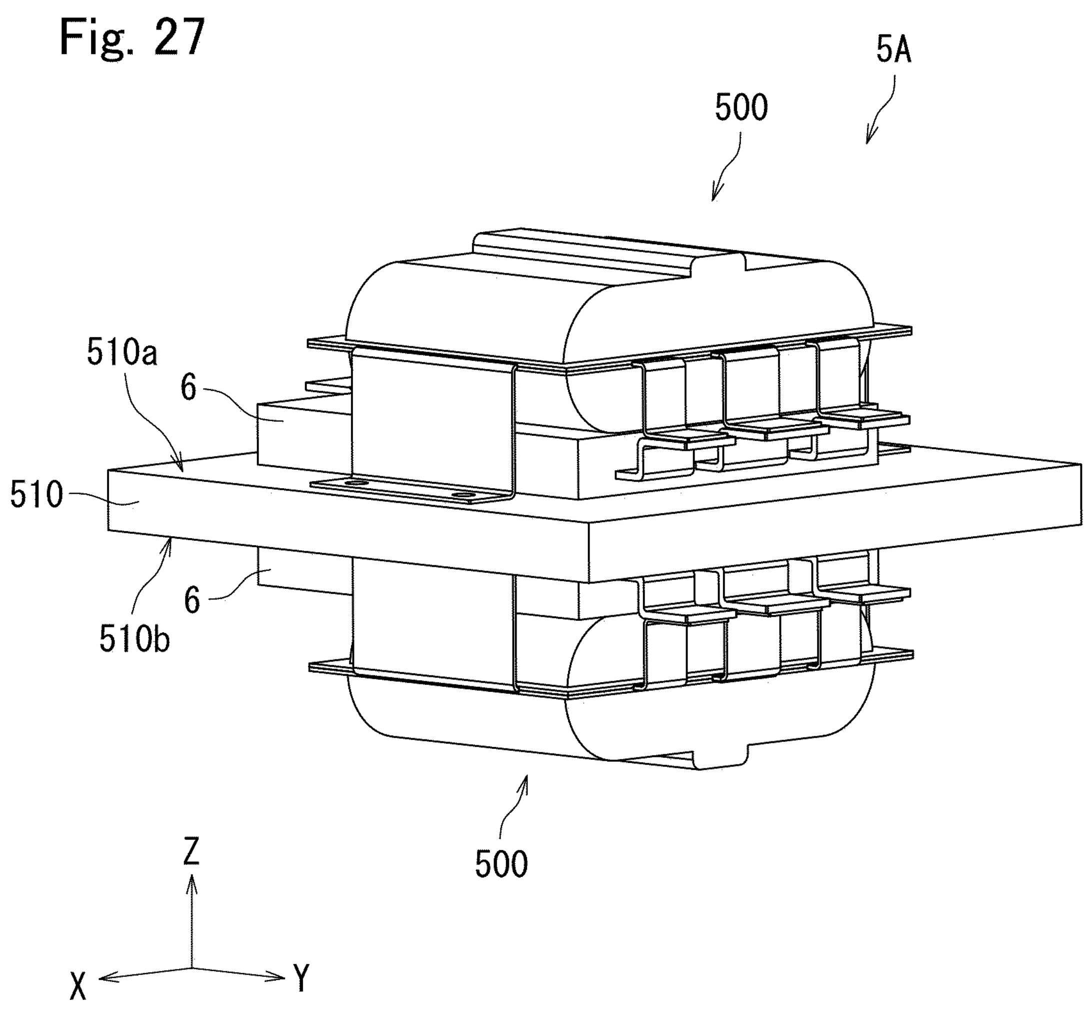
FIG. 27 is a perspective view of a power converter according to a first modification of the fourth embodiment.

FIG. 27 is a perspective view of a power converter according to a first modification of the fourth embodiment. As illustrated in FIG. 27, in a power converter 5A, the power module 6 is disposed on each of an upper surface 510*a* and a lower surface 510*b* of the casing 510. The film capacitor 500 is connected to each power module 6. The power module 6 and the film capacitor 500 may be disposed on both surfaces so as to sandwich the casing 510 in this manner.

Such a configuration contributes to high power density and downsizing of the power converter.

Figure 28:
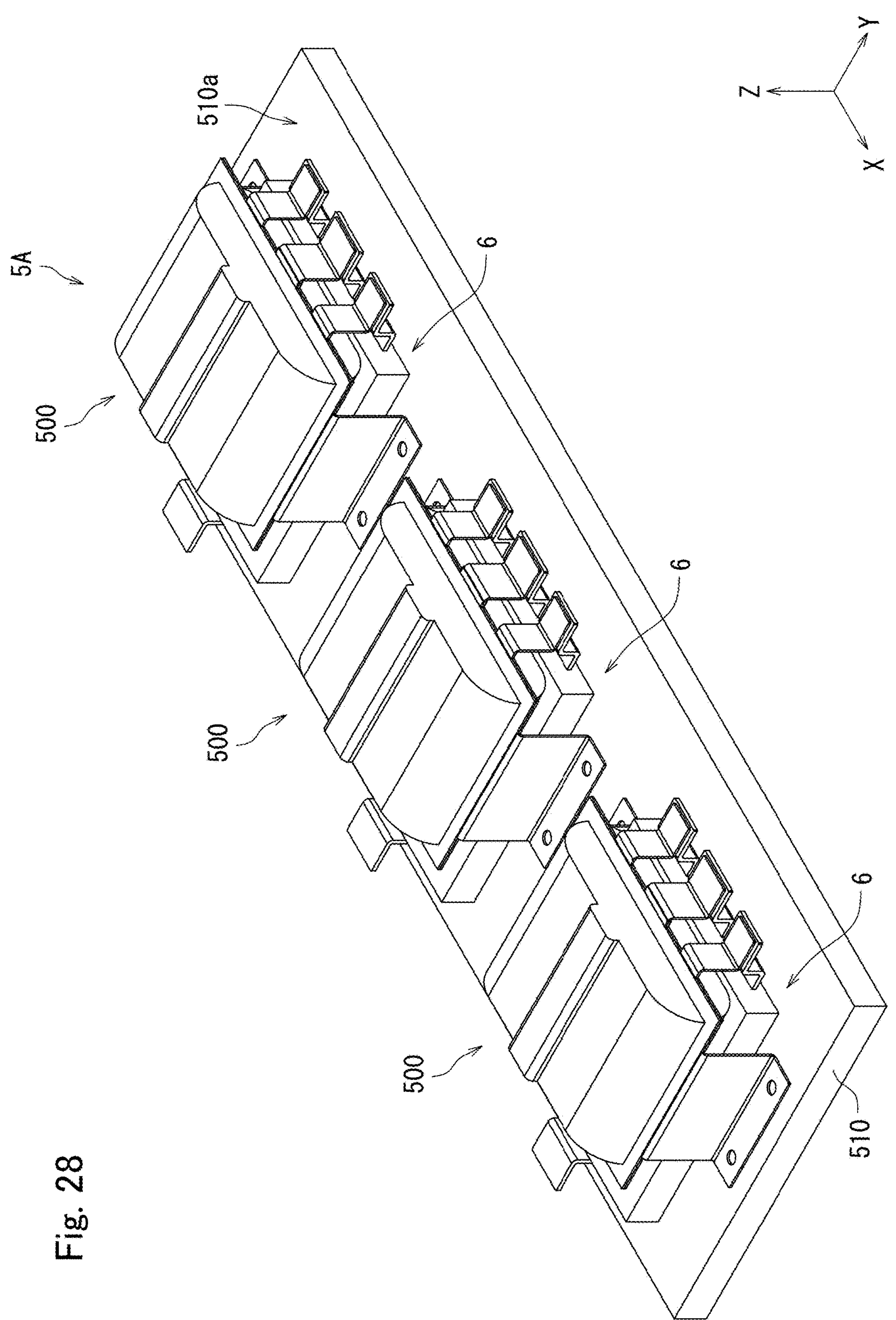
FIG. 28 is a perspective view of a power converter according to a second modification of the fourth embodiment.

FIG. 28 is a perspective view of a power converter according to a second modification of the fourth embodiment. As illustrated in FIG. 28, three power modules 6 may be disposed in a line on the upper surface 510*a* of the casing 510, and three film capacitors 500 may be respectively connected to the power modules 6.

Outline of Embodiment (1) A film capacitor including: a capacitor element including a laminate of a dielectric film and an internal electrode, a first end surface electrode on a first end surface of the laminate, and a second end surface electrode on a second end surface of the laminate; a laminate film including a covering part covering the capacitor element, and a flange extending from an outer edge of the covering part; a first terminal electrode connected to the first end surface electrode of the capacitor element inside the laminate film and exposed to an outside of the laminate film, and a second terminal electrode connected to the second end surface electrode of the capacitor element inside the laminate film and exposed to the outside of the laminate film; and a fixing member including a main body disposed along the capacitor element inside the laminate film, and a fixing part extending from the main body and exposed to the outside of the laminate film.

Such a configuration makes it possible to firmly fix the film capacitor to the casing.

(2) In the film capacitor according to (1), the first and second terminal electrodes and the fixing part may be exposed from the flange.

Such a configuration makes it possible to easily cover the capacitor element with the laminate film.

(3) In the film capacitor according to (2), the flange may include a plurality of sides, and the first and second terminal electrodes and the fixing part may be exposed from different sides of the flange.

Such a configuration makes it possible to suppress interference between the terminal electrode and the fixing member. In addition, the space of the casing can be effectively used.

(4) In the film capacitor according to (3), the fixing part of the fixing member may include two fixing parts, and the two fixing parts may be respectively exposed from two opposing sides of the flange among the different sides of the flange.

Such a configuration makes it possible to more firmly fix the film capacitor to the casing.

(5) In the film capacitor according to any one of (1) to (4), the capacitor element may include a side surface that connects the first and second end surface electrodes, and the main body of the fixing member may be disposed along the side surface of the capacitor element.

Such a configuration makes it possible to more firmly fix the film capacitor to the casing. In addition, since the main body of the fixing member does not straddle the end surface electrode, the influence of the fixing member on the electrical characteristics of the film capacitor can be reduced.

(6) In the film capacitor according to (5), the side surface of the capacitor element includes a pair of flat parts facing each other, and a pair of curved parts connecting the pair of flat parts to each other, and the fixing member is disposed along at least one of the pair of flat parts and at least one of the pair of curved parts.

With such a configuration, the fixing member can be brought into close contact to the side surface of the capacitor element, which makes it possible to more firmly fix the film capacitor to the casing.

(7) In the film capacitor according to any one of (1) to (6), the fixing part of the fixing member may include an extension extending from the main body toward a casing, and a connection part extending from the extension along a mounting surface of the casing to be connected to the fixing part.

With such a configuration, the distance between the film capacitor and the casing can be changed by changing the length of the extension, which can realize an implementation state suitable for the surrounding thermal environment.

(8) In the film capacitor according to (7), the extension may include a first extension extending from the laminate film, and a second extension bent from the first extension and extending toward the casing.

With such a configuration, the connection part can be connected to the casing only by disposing the film capacitor to the casing, which makes it possible to fix the film capacitor to the casing through an easier step.

(9) In the film capacitor according to (7) or (8), the connection part may be provided with a positioning protrusion or a positioning hole for positioning the film capacitor with respect to the casing.

With such a configuration, positioning of the film capacitor to the casing is facilitated, which makes it possible to fix the film capacitor to the casing through an easier step.

(10) In the film capacitor according to any one of (1) to (9), each of the first and second terminal electrodes may include a base extending from the first and second end surface electrodes, respectively, along the flange, and an offset part inclined from the base toward the casing or away from the casing.

With such a configuration, when the film capacitor is fixed to the casing, the terminal electrode of the capacitor and the terminal electrode of an external device can be brought into contact with each other without a gap. Therefore, it is possible to cope with a joining method requiring high dimensional accuracy such as laser welding. Since the dimensional accuracy of the terminal electrode can be relaxed, the production process can be simplified, and the production cost can be reduced.

(11) In the film capacitor according to any one of (1) to (10), the fixing member may be made of a material having conductivity.

With such a configuration, the fixing member can be used as a connection terminal.

(12) In the film capacitor according to (11), the film capacitor may further include first and second Y capacitors respectively connecting the first and second end surface electrodes and the fixing member, and the fixing member may function as a ground terminal.

Such a configuration makes it possible to integrate the Y capacitor with the film capacitor, which can downsize the device. In addition, the production cost for mounting the Y capacitor can be reduced. Further, the fixing member can be caused to function as a ground terminal.

(13) A power convertor comprising a power module, the film capacitor according to any one of (1) to (11), the film capacitor being electrically connected to the power module, and a casing on which the power module and the film capacitor are disposed are included.

Such a configuration makes it possible to firmly fix the film capacitor to the casing, which contributes to high heat resistance and improvement in reliability of the power converter.

(14) In the power converter according to (13), the power module may be disposed between the film capacitor and the casing.

Such a configuration can reduce the mounting area, which contributes to downsizing and weight reduction of a power converter.

The present disclosure is useful for film capacitors used in various electronic devices, electric devices, industrial devices, vehicle devices, and the like.

EXPLANATION OF REFERENCES

1, 5, 5A, 5B power converter
2, 6 power module
10, 210, 410, 510 casing
**10*a*, 210*a*** mounting surface
20, 220, 320, 420, 520 capacitor element
21, 221, 321, 421, 521 end surface electrode
22, 322, 422 side surface
**22*a*, 422*a*** flat part
**22*b*, 422*b*** curved part
30 laminate film
31 covering part
32 flange
40, 240, 340, 440, 540 terminal electrode
242 base
243 offset part
50, 60, 70, 350, 450, 550 fixing member
51, 71, 351, 359, 451, 551 main body
52, 62, 72, 352, 452, 552 fixing part
54, 74, 354, 357, 554 extension
**54*a*** first extension
**54*b*, 64*b*** second extension
55, 75, 355, 358, 455 connection part
100, 200, 300, 300A, 400, 500 film capacitor
560 Y capacitor
**560*a*** first Y capacitor
**560*b*** second Y capacitor

The invention claimed is:

1. A film capacitor comprising:

a capacitor element including a laminate of a dielectric film and an internal electrode, a first end surface electrode on a first end surface of the laminate, and a second end surface electrode on a second end surface of the laminate;

a laminate film including a covering part covering the capacitor element, and a flange extending from an outer edge of the covering part;

a first terminal electrode connected to the first end surface electrode of the capacitor element inside the laminate film and exposed to an outside of the laminate film, and a second terminal electrode connected to the second end surface electrode of the capacitor element inside the laminate film and exposed to the outside of the laminate film; and a fixing member including a main body disposed along the capacitor element inside the laminate film, and a fixing part extending from the main body and exposed to the outside of the laminate film.

2. The film capacitor according to claim 1, wherein the first and second terminal electrodes and the fixing part are exposed from the flange.

3. The film capacitor according to claim 2, wherein the flange includes a plurality of sides, and the first and second terminal electrodes and the fixing part are exposed from different sides of the flange.

4. The film capacitor according to claim 3, wherein the fixing part of the fixing member includes two fixing parts, and the two fixing parts are respectively exposed from two opposing sides of the flange among the different sides of the flange.

5. The film capacitor according to claim 1, wherein the capacitor element includes a side surface that connects the first and second end surface electrodes, and the main body of the fixing member is disposed along the side surface of the capacitor element.

6. The film capacitor according to claim 5, wherein the side surface of the capacitor element includes a pair of flat parts facing each other, and a pair of curved parts connecting the pair of flat parts to each other, and the fixing member is disposed along at least one of the pair of flat parts and at least one of the pair of curved parts.

7. The film capacitor according to claim 6, wherein the fixing member is disposed along at least one of the pair of flat parts and both of the pair of curved parts.

8. The film capacitor according to claim 6, wherein the fixing member is disposed along both of the pair of flat parts and both of the pair of curved parts.

9. The film capacitor according to claim 1, wherein the fixing part of the fixing member includes an extension extending from the main body toward a casing, and a connection part extending from the extension along a mounting surface of the casing to be connected to the fixing part.

10. The film capacitor according to claim 9, wherein the extension includes a first extension extending from the laminate film, and a second extension bent from the first extension and extending toward the casing.

11. The film capacitor according to claim 9, wherein the connection part includes a positioning protrusion or a positioning hole to position the film capacitor with respect to the casing.

12. The film capacitor according to claim 1, wherein each of the first and second terminal electrodes includes a base extending from the first and second end surface electrodes, respectively, along the flange, and an offset part inclined from the base toward the casing or away from the casing.

13. The film capacitor according to claim 1, wherein the fixing member comprises a material having conductivity.

14. The film capacitor according to claim 13, further comprising:

a first Y capacitor connecting the first end surface electrode and the fixing member; and a second Y capacitor connecting the second end surface electrode and the fixing member, wherein the fixing member is configured as a ground terminal.

15. A power converter comprising:

a power module;

the film capacitor according to claim 1 electrically connected to the power module; and a casing on which the power module and the film capacitor are disposed.

16. The power converter according to claim 15, wherein the power module is disposed between the film capacitor and the casing.

* * * * *